(12) United States Patent
Hu et al.

(10) Patent No.: US 10,887,914 B2
(45) Date of Patent: Jan. 5, 2021

(54) ELECTRONIC DEVICE, INFORMATION PROCESSING APPARATUS, AND INFORMATION PROCESSING METHOD

(71) Applicant: SONY CORPORATION, Tokyo (JP)

(72) Inventors: Bingshan Hu, Beijing (CN); Chen Sun, Beijing (CN)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/066,418

(22) PCT Filed: Mar. 28, 2017

(86) PCT No.: PCT/CN2017/078344
§ 371 (c)(1),
(2) Date: Jun. 27, 2018

(87) PCT Pub. No.: WO2017/167165
PCT Pub. Date: Oct. 5, 2017

(65) Prior Publication Data
US 2019/0029044 A1    Jan. 24, 2019

(30) Foreign Application Priority Data
Apr. 1, 2016  (CN) .......................... 2016 1 0203046

(51) Int. Cl.
*H04W 4/00*  (2018.01)
*H04W 74/08*  (2009.01)
(Continued)

(52) U.S. Cl.
CPC ... *H04W 74/0816* (2013.01); *H04W 72/1247* (2013.01); *H04W 72/1268* (2013.01);
(Continued)

(58) Field of Classification Search
CPC ............. H04W 16/14; H04W 72/1247; H04W 72/1268; H04W 74/08; H04W 74/0816; Y02D 70/00
See application file for complete search history.

(56) References Cited

U.S. PATENT DOCUMENTS 8,737,369 B2    5/2014  Yeon et al.
2009/0279427 A1*  11/2009  Ji ...................... H04W 74/0816
370/230
(Continued)

FOREIGN PATENT DOCUMENTS

CN    101150469 A    3/2008
CN    105101446 A    11/2015

OTHER PUBLICATIONS

"WF on CW adjustment for Cat 4 based UL LBT", 3GPP Draft; R1-161393 WF on CWS Adjustment for UL LBT, 3rd Generation Partnership Proiect (3GPP), Mobile Cometence Centre. (Year: 2016).*
(Continued)

*Primary Examiner* — Minh Trang T Nguyen
(74) *Attorney, Agent, or Firm* — Xsensus LLP

(57) ABSTRACT

An electronic device, information processing apparatus, and information processing method. The electronic device at a base station side includes a processor circuit. The processor circuit is configured to acquire information related to a success rate of uplink transmission in an unlicensed frequency band of at least one user equipment unit, wherein the user equipment unit employs a channel detection process to perform carrier sensing on the unlicensed frequency band, and the channel detection process includes a random back-off process having a variable contention window size. The processor circuit is further configured to adjust, based on the information, the contention window size of the user equipment unit. The processor circuit is further configured to perform control, such that the user equipment unit is notified
(Continued)

of the adjusted contention window size or a value of a random back-off counter generated on the basis of the adjusted contention window size.

19 Claims, 15 Drawing Sheets

(51) Int. Cl.
*H04W 72/12* (2009.01)
*H04W 16/14* (2009.01)

(52) U.S. Cl.
CPC ............ *H04W 74/08* (2013.01); *H04W 16/14* (2013.01); *Y02D 30/70* (2020.08)

(56) References Cited

U.S. PATENT DOCUMENTS

| | | | |
|---|---|---|---|
| 2014/0198642 A1* | 7/2014 | Barriac | H04W 74/08 370/230 |
| 2016/0099794 A1* | 4/2016 | Chendamarai Kannan | H04B 17/345 370/329 |
| 2017/0079013 A1* | 3/2017 | Noh | H04W 72/042 |

OTHER PUBLICATIONS

Sharp: "LAA contention windowb size adjustment with HARQ-ACK", 3GPP Draft; R1-1555663RD Generation Partnership Project (3GPP), Mobile Competence Centre (Year: 2015).*
Sony: "Contention window size adjustments", 3GPP Draft; R1-160676, 3rd Generation Partnership Project (3GPP), Mobile Competence Centre (Year: 2016).*
Ericsson: "On CWS adjustment based on HARO-ACK feedback", 3GPP Draft; R1-156034, 3rd Generation Partnership Project (3GPP), Mobile Competence Centre. (Year: 2015).*
International Search Report dated May 26, 2017, in PCT/CN2017/078344, filed Mar. 28, 2017.

* cited by examiner

| Channel access priority ($p$) | $CW_{min,p}$ | $CW_{max,p}$ | Allowed $CW_p$ value |
|---|---|---|---|
| 1 | 3 | 7 | {3,7} |
| 2 | 7 | 15 | {7,15} |
| 3 | 15 | 63 | {15,31,63} |
| 4 | 15 | 1023 | {15,31,63,127,255,511,1023} |

ELECTRONIC DEVICE, INFORMATION PROCESSING APPARATUS, AND INFORMATION PROCESSING METHOD

FIELD

The present disclosure generally relates to the field of wireless communication, and in particular to an electronic device, an information processing apparatus and an information processing method for base station side, and an electronic device, an information processing apparatus and an information processing method for user equipment side.

BACKGROUND

In the third generation partnership project (3GPP), it is expected to define a global uniform Licensed Assisted Access (LAA) framework, in which long term evolution (LTE) data is transmitted using an unlicensed frequency band. The LAA apparatus using an unlicensed frequency band is inevitable to coexist with other communication apparatus such as a Wi-Fi apparatus, a radar apparatus, and a LTE apparatus of another operator.

During the LAA process, in order to avoid a conflict with other apparatus, a user equipment may perform Listen-Before-Talk (LBT) before data transmission, which may result in a reception conflict.

The LBT scheme may be classified as follows:

Category 1 (Cat 1): performing no LBT;

Category 2 (Cat 2): LBT without a random back-off process;

Category 3 (Cat 3): performing LBT including a random back-off process by using a contention window having a fixed size; and Category (Cat 4): performing LBT including a random back-off process by using a contention window having a variable size.

SUMMARY

Brief summary of embodiments of the present disclosure is given hereinafter, to provide basic understanding for certain aspects of the present disclosure. It should be understood that, the summary is not exhaustive summary of the present disclosure. The summary is not intended to determine key parts or important parts of the present disclosure, and is not intended to limit the scope of the present disclosure. An object of the summary is only to give some concepts of the present disclosure in a simplified form, as preamble of the detailed description later.

According to an embodiment, an electronic device for base station side is provided, which includes a processing circuit. The processing circuit is configured to acquire information on a success rate of uplink transmission of at least one user equipment on an unlicensed frequency band, where the user equipment performs Listen-Before-Talk on the unlicensed frequency band via a channel detection process which includes a random back-off process having a variable contention window size. The processing circuit is further configured to adjust the contention window size of the user equipment based on the information. The processing circuit is further configured to control to notify the user equipment of the adjusted contention window size or a random back-off counter value generated based on the adjusted contention window size.

According to another embodiment, an information processing apparatus for base station side is provided, which includes a transceiving device and a processing circuit. The processing circuit is configured to acquire information on a success rate of uplink transmission of at least one user equipment on an unlicensed frequency band, where the user equipment performs Listen-Before-Talk on the unlicensed frequency band via a channel detection process which includes a random back-off process having a variable contention window size. The processing circuit is further configured to adjust the contention window size of the user equipment based on the information. The processing circuit is further configured to control the transceiving device to notify the user equipment of the adjusted contention window size or a random back-off counter value generated based on the adjusted contention window size.

According to yet another embodiment of the present disclosure, an information processing method for base station side is provided. The method includes a step of acquiring information on a success rate of uplink transmission of at least one user equipment on an unlicensed frequency band, where the user equipment performs Listen-Before-Talk on the unlicensed band via a channel detection process which includes a random back-off process having a variable contention window size. The method further includes a step of adjusting the contention window size of the user equipment based on the information. The method further includes a step of notifying the user equipment of the adjusted contention window size or a random back-off counter value generated based on the adjusted contention window size.

According to still another embodiment, an electronic device for user equipment side is provided, which includes a processing circuit. The processing circuit is configured to control to receive information indicating a contention window size or a random back-off counter value generated based on the contention window size, where the contention window size is adjusted based on a success rate of uplink transmission of at least one user equipment on an unlicensed frequency band. The processing circuit is further configured to control, based on the contention window size or the random back-off counter value, Listen-Before-Talk on the unlicensed frequency band via a random back-off process having a variable contention window size.

According to yet another embodiment, an information processing apparatus for user equipment side is provided, which includes a transceiving device and a processing circuit. The processing circuit is configured to control the transceiving device to receive information indicating a contention window size or a random back-off counter value generated based on the contention window size, where the contention window size is adjusted based on a success rate of uplink transmission of at least one user equipment on an unlicensed frequency band. The processing circuit is further configured to control, based on the contention window size or the random back-off counter value, the transceiving device to perform Listen-Before-Talk on the unlicensed frequency band via a random back-off process having a variable contention window size.

According to still another embodiment, an information processing method for user equipment side is provided. The method includes a step of receiving information indicating a contention window size or a random back-off counter value generated based on the contention window size, where the contention window size is adjusted based on a success rate of uplink transmission of at least one user equipment on an unlicensed frequency band. The method further includes a step of performing, based on the contention window size or the random back-off counter value, Listen-Before-Talk on the unlicensed frequency band via a random back-off process having a variable contention window size.

According to the embodiments of the present disclosure, the contention window size for Listen-Before-Talk is adjusted based on the success rate of uplink transmission, thereby a case that a channel conflict occurs for uplink transmissions performed on the unlicensed frequency band can be better avoided.

BRIEF DESCRIPTION OF THE DRAWINGS

The present disclosure may be understood better with reference to the description given in conjunction with drawings hereinafter. The same or similar reference numerals are used to indicate the same or similar components throughout all the drawings. The drawings together with the following detailed description are included in the specification, form a part of the specification, and are used to further illustrate preferred embodiments of the present disclosure and explain principles and advantages of the present disclosure by examples. In the drawings.

DETAILED DESCRIPTION OF EMBODIMENTS

Figure 1:
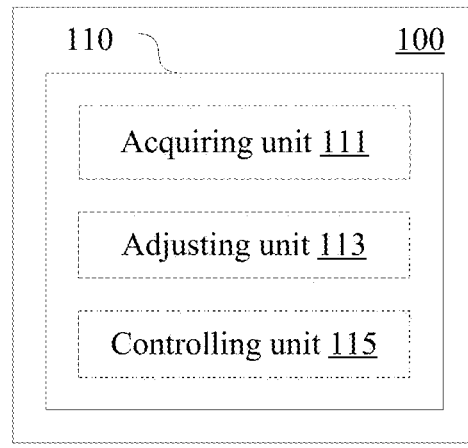
FIG. 1 is a block diagram showing a configuration example of an electronic device for base station side according to an embodiment of the present disclosure.

Hereinafter embodiments of the present disclosure are described with reference to the drawings. Elements and features described in one drawing or one embodiment of the present disclosure may be combined with elements and features described in one or more other drawings or embodiments. It should be noted that, indication and description of components and processing which are not related to the present disclosure or well known for those skilled in the art are omitted in the drawings and illustrations for clearness.

As shown in FIG. 1, an electronic device 100 for base station side according to an embodiment includes a processing circuit 110. The processing circuit 110 may be implemented as a specific chip, a chipset or a central processing unit (CPU) or the like.

The processing circuit 110 includes an acquiring unit 111, an adjusting unit 113 and a controlling unit 115. It should be noted that, although the acquiring unit 111, the adjusting unit 113 and the controlling unit 115 are shown by functional blocks, it should be understood that functions of the acquiring unit 111, the adjusting unit 113 and the controlling unit 115 may be implemented by the processing circuit 110 as a whole, and are not necessarily implemented by discrete actual components in the processing circuit 110. In addition, although the processing circuit 110 is shown by one block, the electronic device 100 may include multiple processing circuits. The functions of the acquiring unit 111, the adjusting unit 113 and the controlling unit 115 may be distributed onto multiple processing circuits, and thus the multiple processing circuits cooperate to perform the functions.

The acquiring unit 111 is configured to acquire information on a success rate of uplink transmission of at least one user equipment on an unlicensed frequency band. The user equipment performs Listen-Before-Talk on the unlicensed frequency band via a channel detection process which includes a random back-off process having a variable contention window size (hereinafter, such LBT is referred to as Cat 4 LBT).

Specifically, the uplink transmission may, for example, include a physical uplink shared channel (PUSCH) transmission. Further, the uplink transmission includes data transmission on the PUSCH.

The adjusting unit 113 is configured to adjust a content window size (which may be referred to as CWS hereinafter) of the user equipment based on the information on the success rate of uplink transmission of the user equipment on the unlicensed frequency band acquired by the acquiring unit 111.

According to a specific implementation, processing of the acquiring unit 111 and the adjusting unit 113 may be UE-specific or Cell-specific, and may be performed for a single user equipment or multiple user equipments.

According to an embodiment, the information acquired by the acquiring unit 111 indicates a success rate of uplink transmission of a first user equipment among user equipments capable of performing the Cat 4 LBT in at least one subframe in a previous uplink transmission burst, where the first user equipment is scheduled in the at least one subframe. The adjusting unit 113 further adjusts a contention window size of the first user equipment.

The transmission burst is defined as follows. The transmission burst is a continuous transmission from a transmission node, and there is no transmission from the node on a same carrier immediately prior or posterior to the continuous transmission. From an aspect of the user equipment, the uplink transmission burst is a continuous transmission from the user equipment, and there is no transmission from the user equipment on a same carrier immediately prior or posterior to the continuous transmission. It should be noted that, although the uplink transmission burst is explained from the aspect of the user equipment, the uplink transmission burst may also be defined from an aspect of a base station. In addition, a previous uplink transmission burst is an uplink transmission burst prior to an uplink transmission burst of which a contention window size is to be determined, and may be a previous uplink transmission burst preferably.

Specifically, the at least one subframe may be a last one of subframes in which the first user equipment is scheduled in a previous uplink transmission burst. Alternatively, the at least one subframe may also include all subframes in which the first user equipment is scheduled in the previous uplink transmission burst. However, the above at least one subframe is not limited thereto, and may include any subset of subframes in the previous uplink transmission burst, such as the last two subframes, the last three subframes, . . . , the last n−1 subframes (n indicates the number of subframes included in the previous uplink transmission burst).

Subsequently, reference is made to FIG. 2 to FIG. 4 which are schematic diagrams illustrating exemplar manners of acquiring information on an uplink transmission success rate and adjusting a CWS for a single user equipment.

Figure 2:
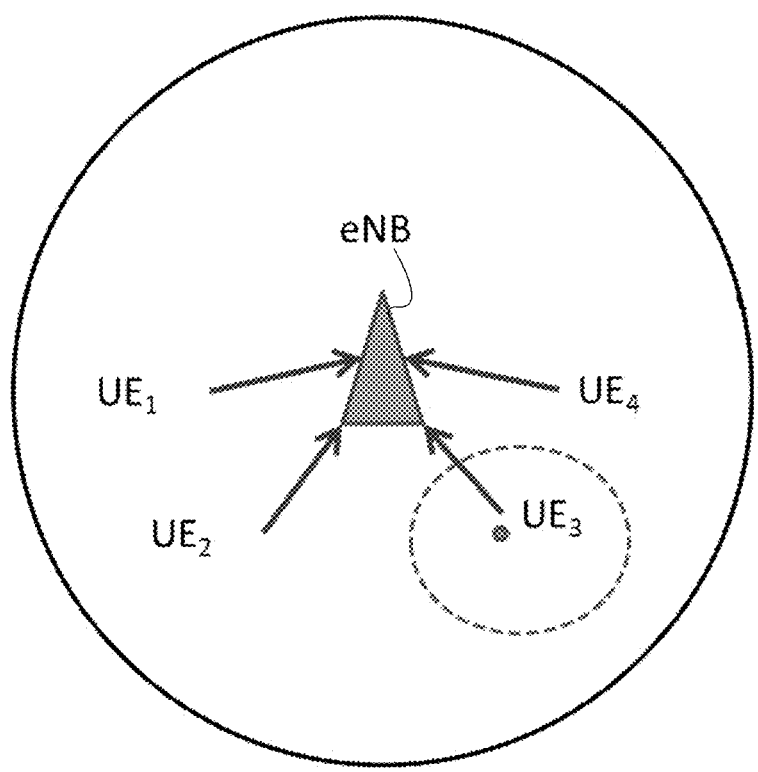
FIG. 2 is a schematic diagram showing an exemplary manner of adjusting a contention window size according to an embodiment of the present disclosure.

As shown in FIG. 2, among user equipments UE1, UE2, UE3 and UE4 served by a base station eNB, for each user equipment, the information on the uplink transmission success rate is acquired and the CWS is adjusted independently.

Figure 3A:
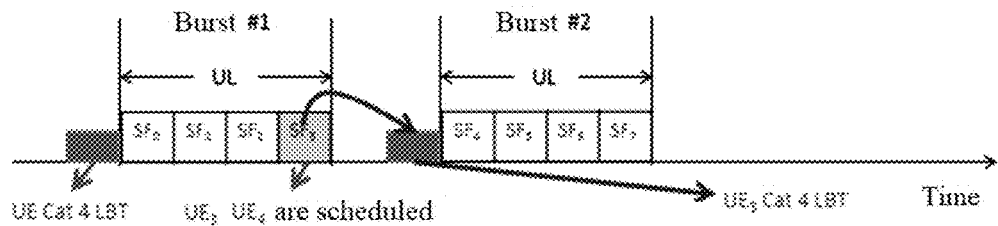
FIG. 3A and FIG. 3B are schematic diagrams showing an exemplary manner of adjusting a contention window size according to an embodiment of the present disclosure.
Figure 3B:
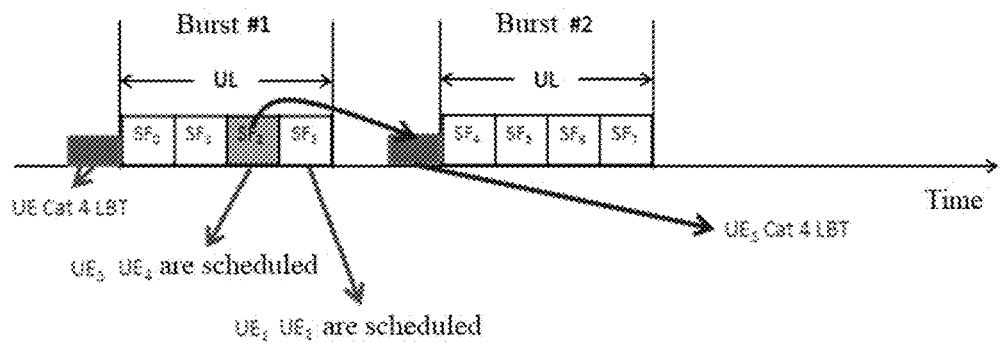

Reference is made to FIG. 3A and FIG. 3B to describe a first exemplary manner of acquiring the information on the uplink transmission success rate and adjusting the CWS for a single user equipment (UE3 in the shown example).

In the first exemplary manner, the uplink transmission success rate is determined based on the last one of subframes in which a single user equipment is scheduled in the previous uplink transmission burst.

As shown in FIG. 3A, in four subframes SF0 to SF3 of transmission burst #1, UE3 and UE4 are scheduled in a subframe SF3, that is, the last one of subframes in which UE3 is scheduled in the previous uplink transmission burst is SF3. Therefore, a success rate of PUSCH transmission, for example, of the UE3 in the subframe SF3 in the burst #1 is determined, and the CWS is adjusted based on the success rate.

Specifically, the transmission success rate may be determined based on a single subframe. For example, in a case that PUSCH in the subframe has one code word, the success rate may be 0% (the PUSCH is not received) or 100% (the PUSCH is received). In a case that the PUSCH in the subframe has two code words, a hybrid automatic repeat request acknowledgment (HARQ-ACK) value of each of the two code words may be considered, and for the subframe, the success rate may be 0% (the PUSCH is not received), 50% (one code word of the PUSCH is received) or 100% (two code words of the PUSCH are received).

As shown in FIG. 3B, in the four subframes SF0 to SF3 of the burst #1, UE1 and UE2 are scheduled in a subframe SF3, and UE3 and UE4 are scheduled in a subframe SF2. That is, the last one of subframes in which UE3 is scheduled in the previous uplink transmission burst is SF2. Therefore, a success rate of PUSCH transmission, for example, of the UE3 in the subframe SF2 in the burst #1 is determined, and the CWS is adjusted based on the success rate.

Figure 4:
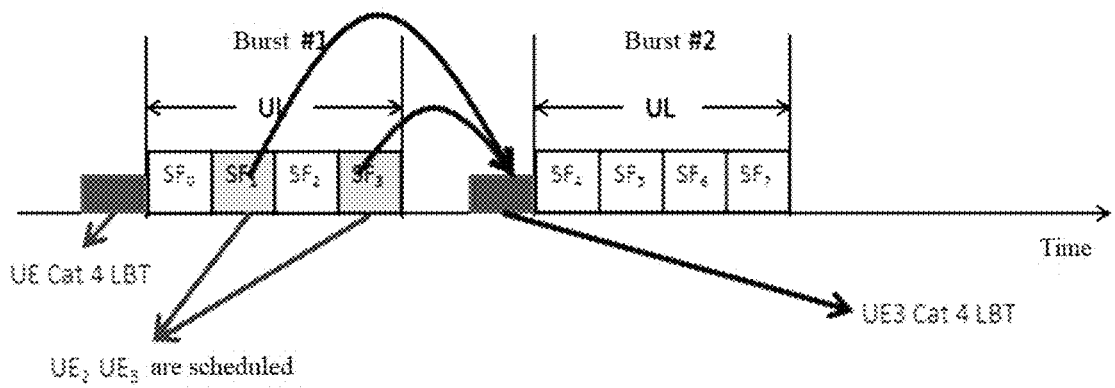
FIG. 4 is a schematic diagram showing another exemplary manner of adjusting a contention window size according to an embodiment of the present disclosure.

Reference is made to FIG. 4 to describe a second exemplary manner of acquiring the information on the uplink transmission success rate and adjusting the CWS for a single user equipment (UE3 in the shown example)

In the second exemplary manner, the uplink transmission success rate is determined based on all subframes in which a single user equipment is scheduled in a previous uplink transmission burst.

As shown in FIG. 4, in four subframes SF0 to SF3 of the burst #1, UE2 and UE3 are scheduled in subframes SF1 and SF3, and the UE3 is not scheduled in subframes SF0 and SF2. That is, subframes in which the UE3 is scheduled in the previous uplink transmission burst include SF1 and SF3. Therefore, a success rate of PUSCH transmission, for example, of the UE3 in subframes SF1 and SF3 in the burst #1 is determined, and the CWS is adjusted based on the success rate.

Specifically, in a case that the transmission success rate is determined based on multiple subframes, a corresponding transmission success rate may be determined by considering an HARQ-ACK value of each code word in each subframe.

In addition, according to another embodiment, the information acquired by the acquiring unit 111 indicates a success rate of uplink transmission of all user equipments (UE1 to UE4 in the above example) capable of performing Cat4 LBT in at least one subframe in a previous uplink transmission burst. It should be noted that, the embodiment of the present disclosure also includes a solution in which processing for multiple (not necessarily all) user equipments capable of performing Cat4 LBT which are served by the base station.

Specifically, the at least one subframe may be the last subframe in the previous uplink transmission burst. Alternatively, the at least one subframe may include all subframes in the previous uplink transmission burst. However, the at least one subframe is not limited to the above, and may include any subset of subframes in the previous uplink transmission burst, such as the last two subframes, the last three subframes, . . . , and the last n−1 subframes (n indicates the number of subframes included in the previous uplink transmission burst).

Subsequently, reference is made to FIG. 5 to FIG. 7, which are schematic diagrams illustrating exemplary manners of acquiring information on an uplink transmission success rate and adjusting a CWS for multiple user equipments.

Figure 5:
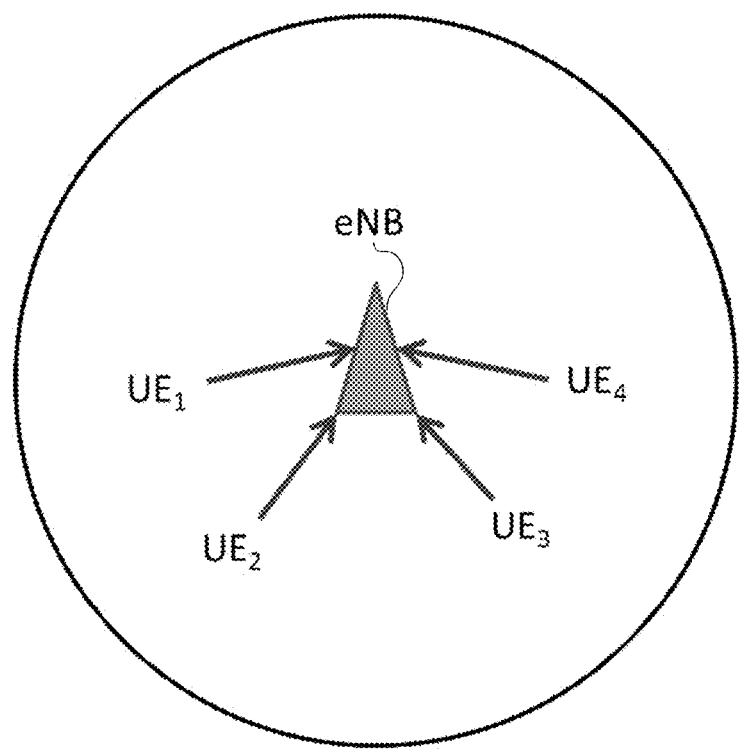
FIG. 5 is a schematic diagram showing another exemplary manner of adjusting a contention window size according to an embodiment of the present disclosure.

As shown in FIG. 5, information on the uplink transmission success rate is acquired and the CWS is adjusted for user equipments UE1, UE2, UE3 and UE4 served by a base station eNB.

Figure 6:
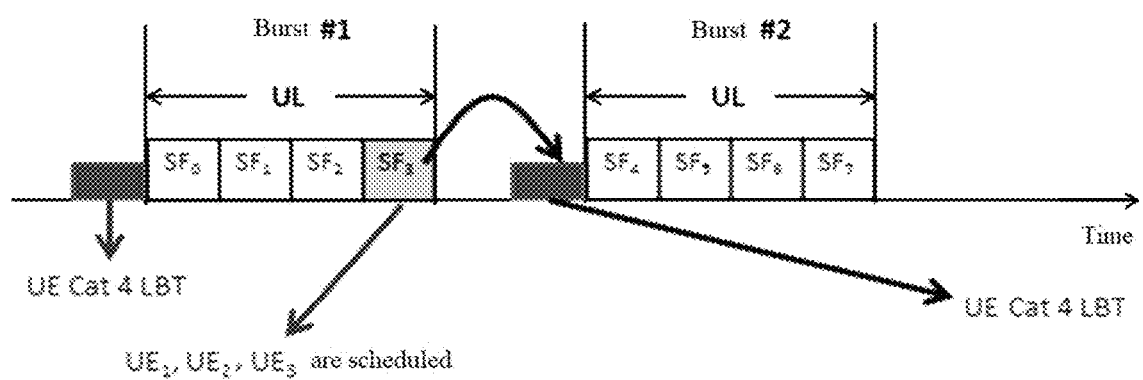
FIG. 6 is a schematic diagram showing an exemplary manner of adjusting a contention window size according to an embodiment of the present disclosure.

Reference is made to FIG. 6 which shows a first exemplary manner of acquiring information on an uplink transmission success rate and adjusting a CWS for multiple user equipments (UE1 to UE4 in the shown example).

In the first exemplary manner, the uplink transmission success rate is determined based on a last subframe in a previous uplink transmission burst.

As shown in FIG. 6, in a subframe SF3 of the burst #1, UE1, UE2 and UE3 are scheduled. Therefore, a ratio of PUSCH HARQ-ACK values of UE1, UE2 and UE3 in subframe SF3 in the burst #1 may be acquired as the uplink transmission success rate, for example.

Figures 7, 8:
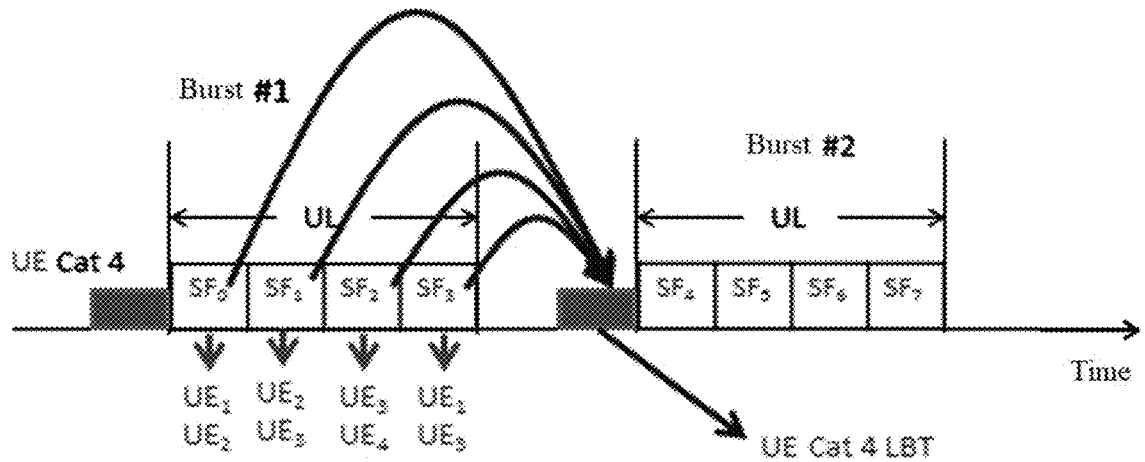
FIG. 7 is a schematic diagram showing another exemplary manner of adjusting a contention window size according to an embodiment of the present disclosure.
FIG. 8 is a list showing examples of contention window sizes predetermined based on channel access priorities according to an embodiment of the present disclosure.

Reference is made to FIG. 7 to describe a second exemplary manner of acquiring information on an uplink transmission success rate and adjusting a CWS for multiple user equipments (UE1 to UE4 in the shown example).

In the second exemplary manner, the uplink transmission success rate is determined based on all subframes in which multiple user equipments are scheduled in a previous uplink transmission burst.

As shown in FIG. 7, in subframe SF0 of a burst #1, UE1 and UE2 are scheduled. In subframe SF1 of the burst #1, UE2 and UE3 are scheduled. In subframe SF2 of the burst #1, UE3 and UE4 are scheduled. In subframe SF3 of the burst #1, UE1 and UE3 are scheduled. However, the uplink transmission success rate is determined overall based on the SF0 to SF3 in the burst #1, irrelevant to the scheduled user equipment.

However, as described above, the uplink transmission success rate may also be determined based on subframes SF2 and SF3, or the uplink transmission success rate may be determined based on subframes SF1, SF2 and SF3, and so on.

Subsequently, an exemplary manner of adjusting a CWS based on the uplink transmission success rate by the adjusting unit 113 is described.

According to an embodiment, the adjusting unit 113 is configured to increase the CWS in a case that the transmission success rate acquired by the acquiring unit 111 is lower than a predetermined threshold. The uplink transmission success rate is acquired by the above exemplary manner, for example. Accordingly, different predetermined thresholds may be set for different manners of acquiring the uplink transmission success rate.

For example, as described in the above examples, for the uplink transmission success rate of 0% or 100% (a case for a single user equipment, a single subframe and the subframe including a single code word), the CWS may be increased in a case that the uplink transmission success rate is 0%, and the CWS is not changed in a case that the uplink transmission success rate is 100%. In other words, the predetermined threshold may be actually set as any value in a range of 0% to 100%. For another example, for the uplink transmission success rate of 0%, 50% or 100%, the CWS may be increased in a case that the uplink transmission success rate is 0%, and the CWS is not changed in a case that the uplink transmission success rate is 50% or 100% (in this case, the predetermined threshold may be actually set as any value in a range of 0% to 50%). Alternatively, the CWS may be increased in a case that the uplink transmission success rate is 0% or 50%, and the CWS is not changed in a case that the uplink transmission success rate is 100% (in this case, the predetermined threshold may be actually set as any value in a range of 50% to 100%).

A corresponding predetermined threshold may be set in a case that the CWS is adjusted based on the transmission success rate of multiple user equipments and/or the transmission success rate of multiple subframes. For example, the overall success rate threshold may be set as 20% (corresponding to a case that NACK ratio of HARQ-ACK values for corresponding PUSCH transmission is 80%, for example), 25% and 30% and so on.

In addition, multiple thresholds may be set. For example, the CWS is increased in a case that the success rate is lower than a first threshold, the CWS is not changed in a case that the success rate is between the first threshold and a second threshold, and the CWS is reduced in a case that the success rate is higher than the second threshold.

In addition, multiple manners of adjusting the CWS based on the predetermined threshold may be conceived.

According to an embodiment, the CWS value may be selected from multiple predetermined CWS values. In addition, the adjusting by the adjusting unit 113 may include: switching the selection from predetermined contention window sizes.

Further, the multiple predetermined CWS values may include multiple groups of contention window sizes predetermined based on channel access priorities.

FIG. 8 shows an example of contention window sizes predetermined based on channel access priorities. In which, a channel access priority p is classified into 4 levels, a high priority (a priority 1 is the highest priority) corresponds to a service with a high requirement on response time for example, and a low priority corresponds to a service with a low requirement on the response time for example. For the priority 1, a minimum value of the CWS is 3, a maximum value of the CWS is 7, and the values of the CWS may be selected from 3 and 7. For a priority 2, a minimum value of the CWS is 7, a maximum value of the CWS is 15, and values of the CWS may be selected from 7 and 15. For a priority 2, a minimum value of the CWS is 15, a maximum value of the CWS is 63, and values of the CWS may be selected from 15, 31 and 63. For a priority 4, a minimum value of the CWS is 15, a maximum value of the CWS is 1023, and values of the CWS may be selected from 15, 31, 63, 127, 255, 511 and 1023. A random back-off counter value may be generated based on the CWS value. For example, in a case that the value of the CWS is 3, the generated random back-off counter value may be 1, 2 or 3, for example. The setting manner of the CWS value is only schematic rather than restrictive, and different CWS values may be set for specific applications. Further, in a case that the adjusting unit adjusts the CWS corresponding to a certain priority, CWSs corresponding to other priorities are also adjusted. The adjustment manner is the same as the manner described in the embodiment of the present disclosure. For example, in a case that the CWS corresponding to a certain priority is increased, CWSs corresponding to other priorities are also increased, and vice versa.

Returning to refer to FIG. 1, the controlling unit 115 is configured to control to notify the user equipment of the adjusted CWS or a random back-off counter value (hereinafter, which can also be referred to as counter) generated based on the adjusted CWS.

In a case that the adjusted CWS is notified to the user equipment, the user equipment randomly generates a random back-off counter value based on the notified CWS to perform a random back-off process. In another aspect, in a case that the random back-off counter value generated based on the adjusted CWS is notified to the user equipment, a random back-off counter value to be used by the user equipment is randomly generated by a base station based on the adjusted CWS.

It should be noted that, notifying the user equipment of the adjusted CWS here may include notifying the user equipment of an adjustment manner for the CWS, and does not necessarily include notifying the user equipment of the specific CWS value. For example, as described above in conjunction with specific embodiments, in a case that the CWS is selected from multiple predetermined CWSs, the base station may notify the user equipment of information of increasing the CWS for example, and the user equipment may, based on the instruction, select a new CWS greater than a current CWS from predetermined CWSs.

For example, the controlling unit 115 may control to notify, by using channels specific to user equipments, the user equipments of the adjusted CWS or the corresponding random back-off counter value. Particularly, in a case that it is determined to adjust the CWS for multiple user equipments as a whole and the user equipment is to be notified of the adjusted CWS, the adjusted CWS may also be transmitted to multiple user equipments via a broadcast channel, for example.

In addition, the CWS adjustment solution according to the embodiment of the present disclosure may be applied to a case that uplink transmission is performed by using multiple unlicensed frequency band carriers. That is, the user equipment may perform Listen-Before-Talk on multiple unlicensed frequency band carries (or one of multiple unlicensed frequency band carriers) by using the manner in the above embodiments, and performs uplink transmission by using the multiple unlicensed frequency band carriers. Before describing the embodiments, a process of multi-carrier transmission is briefly illustrated firstly.

In a case that uplink transmission is performed by using multiple unlicensed frequency band carriers, carriers may be accessed by using one the following manners:

Manner A: channel detection processes (such as LBT) of carriers on the unlicensed frequency band are independent from each other. According to different adjustment manners for the CWS, manner A may be classified into manner A1 and manner A2;

Manner A1: the CWS is adjusted for each carrier and a random back-off counter value is generated for each carrier so as to be used for LBT of a corresponding carrier;

Manner A2: the CWS is adjusted for each of the carriers, and a random back-off counter value is generated based on a maximum CWS among CWSs of the carriers, so as to be used for LBT of each carrier;

Manner B: the carriers on the unlicensed frequency band include a primary carrier and a secondary carrier, Cat4 LBT is performed for the primary carrier and Cat2 LBT is performed for the secondary carrier. According to different adjustment manners for the CWS on the primary carrier, manner B may be classified into manner B1 and manner B2:

Manner B1: CWS adjustment of the primary carrier is determined based on a transmission success rate on all carriers, so as to be used for LBT of the primary carrier; and Manner B2: the CWS adjustment is determined for each carrier, and a random back-off counter value for the LBT of the primary carrier is generated based on the maximum CWS.

Corresponding to the above manner A1, according to an embodiment, the acquiring unit 111 and the adjusting unit 113 are respectively configured to acquire a success rate of uplink transmission and to adjust the CWS for each of multiple carriers on the unlicensed frequency band. In addition, the controlling unit 115 is configured to notify the user equipment of a contention window size adjusted for a corresponding carrier or a random back-off counter value generated based on the adjusted contention window size, so as to be used for the corresponding carrier.

Corresponding to the above manner A2, according to an embodiment, the acquiring unit 111 and the adjusting unit 113 are respectively configured to acquire a success rate of uplink transmission and to adjust the CWS for each of multiple carriers on the unlicensed frequency band. In addition, the controlling unit 115 is configured to generate a random back-off counter value for a maximum contention window size among contention window sizes adjusted for the carriers, and notify the user equipment of the random back-off counter value generated based on the maximum contention window size, so as to be used for LBT of all carriers.

Corresponding to the above manner B1, according to an embodiment, the acquiring unit 111 and the adjusting unit 113 are respectively configured to acquire a success rate of uplink transmission and to adjust the CWS for a primary carrier among multiple carriers on the unlicensed frequency band by one of the following manners: acquiring information on a transmission success rate based on a last one of subframes in which a first user equipment is scheduled in each of multiple carriers in a previous uplink transmission burst, and adjusting a contention window size of the first user equipment for the primary carrier; acquiring information on the transmission success rate based on all subframes in which the first user equipment is scheduled in each of the multiple carriers in the previous uplink transmission burst, and adjusting the contention window size of the first user equipment for the primary carrier; acquiring information on the transmission success rate based on all uplink transmissions (such as PUSCH data transmission) performed in the last subframe in each of the multiple carriers in the previous uplink transmission burst, and adjusting the contention window size of the primary carrier, where the adjusted contention window size applies to all user equipments; acquiring information on the transmission success rate based on all uplink transmissions (such as PUSCH data transmission) performed in all subframes of all user equipments in each of the multiple carriers in the previous uplink transmission burst, and adjusting the contention window size of the primary carrier, where the adjusted contention window size applies to all user equipments.

Corresponding to the above manner B2, according to an embodiment, the acquiring unit 111 and the adjusting unit 113 are respectively configured to acquire a success rate of uplink transmission and to adjust the CWS for each of the multiple carriers on the unlicensed frequency band. In addition, the controlling unit 115 is configured to generate a random back-off counter value based on a maximum contention window size among contention window sizes adjusted for the carriers, and notify the user equipment of the random back-off counter value generated based on the maximum contention window size, so as to be used for LBT of the primary carrier.

Next, description is made for exemplary manners of the embodiments of combined solutions. In the following description, it is assumed that user equipments include UE1, UE2 and UE3, carriers include Carrier 1, Carrier 2 and Carrier 3, and CWS adjustment corresponding to respective user equipments and respective carriers is shown by the following table.

TABLE 1

|  | UE1 | UE2 | UE3 |
| --- | --- | --- | --- |
| Carrier 1 | CWS11 | CWS12 | CWS13 |
| Carrier 2 | CWS21 | CWS22 | CWS23 |
| Carrier 3 | CWS31 | CWS32 | CWS33 |

(1) A case where multi-carrier access manner in A1 is adopted, and the CWS adjustment is determined independently for each user equipment.

Firstly, for each carrier, the CWS adjustment is determined by using the solution that the CWS adjustment is determined independently for each user equipment in the present disclosure. That is, CWS11, CWS12 and CWS13 are determined for Carrier 1, CWS21, CWS22 and CWS23 are determined for Carrier 2, and CWS31, CWS32 and CWS33 are determined for Carrier 3.

Then, for each user equipment, the required CWS adjustment is determined. Specifically, the CWS adjustment of UE1 on each carrier is determined as CWS11, CWS21 and CWS31, respectively. The CWS adjustment of UE2 on each carrier is determined as CWS12, CWS22 and CWS32, respectively. The CWS adjustment of UE3 on each carrier is determined as CWS13, CWS23 and CWS33, respectively.

For Carrier 1, the base station generates Counter11 for UE1 based on CWS11. For Carrier 2, the base station generates Counter21 for the UE1 based on CWS21. For Carrier 3, the base station generates Counter31 for the UE1 based on CWS31. For U2 and U3, counters are respectively generated in a manner similar to the UE1.

(2) A case where multi-carrier access manner in A2 is adopted, and the CWS adjustment is determined independently for each user equipment.

Firstly, for each carrier, the CWS adjustment is determined by using a solution that the CWS adjustment is determined independently for each user equipment in the present disclosure. That is, for Carrier 1, CWS11, CWS12 and CWS13 are determined. For Carrier 2, CWS21, CWS22 and CWS23 are determined. For Carrier 3, CWS31, CWS32 and CWS33 are determined.

Then, the CWS adjustment of UE1 for each carrier is determined as CWS11, CWS21 and CWS31, respectively. The base station generates a counter based on the maximum one among CWS11, CWS21 and CWS31, to function as a counter for LBT of the UE1 on each carrier. For U2 and U3, counters are generated in the manner similar to the UE1.

(3) A case where multi-carrier access manner in B2 is adopted, and the CWS adjustment is determined independently for each user equipment.

Firstly, for each carrier, the CWS adjustment is determined by using a solution that the CWS adjustment is determined independently for each user equipment in the present disclosure. That is, for Carrier 1, CWS11, CWS12 and CWS13 are determined. For Carrier 2, CWS21, CWS22 and CWS23 are determined. For Carrier 3, CWS31, CWS32 and CWS33 are determined.

Then, the CWS adjustment of the UE1 on each carrier is determined as CWS11, CWS21 and CWS31, respectively.

For the primary carrier, a counter is generated based on the maximum one among CWS11, CWS21 and CWS31, and the counter is notified to the UE1. For the secondary carrier, Cat2 LBT may be performed. For UE2 and UE3, similar processing is performed.

(4) A case where multi-carrier access manner in A1 is adopted, and the CWS adjustment is commonly determined for multiple user equipments.

Firstly, for Carrier 1, CWS1 (CWS1 is shared by UE1, UE2 and UE3, i.e., CWS11=CWS12=CWS13=CWS1) is determined by using a solution that the CWS adjustment is commonly determined for multiple user equipments according to the embodiment of the present disclosure. Similarly, for Carrier 2, CWS2 (CWS21=CWS22=CWS23=CWS2) is determined. For Carrier 3, CWS3 (CWS31=CWS32=CWS33=CWS3) is determined.

Then, for Carrier 1, counters generated for UE1, UE2 and UE3 are all based on CWS1. For carrier 2, counters generated for UE1, UE2 and UE3 are all based on CWS2. For Carrier 3, counters generated for UE1, UE2 and UE3 are all based on CWS3.

(5) A case where multi-carrier access manner in A2 is adopted, and the CWS adjustment is commonly determined for multiple user equipments.

Firstly, for Carrier 1, CWS1 (CWS1 is shared by UE1, UE2 and UE3, i.e., CWS11=CWS12=CWS13=CWS1) is determined by using a solution that the CWS adjustment is commonly determined for multiple user equipments according to the embodiment of the present disclosure. Similarly, for Carrier 2, CWS2 (CWS21=CWS22=CWS23=CWS2) is determined. For Carrier 3, CWS3 (CWS31=CWS32=CWS33=CWS3) is determined.

Then, a counter is generated based on the maximum one among CWS1, CWS2 and CWS3, and the counter functions as a counter of UE1, UE2 and UE3 on respective carriers uniformly. In this case, the same counter is adopted by different user equipments on respective carriers.

(6) A case where multi-carrier access manner in B2 is adopted, and the CWS adjustment is commonly determined for multiple user equipments.

Firstly, for Carrier 1, CWS1 (CWS11=CWS12=CWS13=CWS1) is determined by using a solution that the CWS adjustment is commonly determined for multiple user equipments according to the embodiment of the present disclosure. For Carrier 2, CWS2 (CWS21=CWS22=CWS23=CWS2) is determined. For Carrier 3, CWS3 (CWS31=CWS32=CWS33=CWS3) is determined.

A counter is determined based on the maximum one among CWS1, CWS2 and CWS3, and the counter functions as a counter of UE1, UE2 and UE3 on the primary carrier uniformly.

Subsequently, reference is made to FIG. 23A to FIG. 23D which show exemplary manners for adjusting the CWS in a case that a multi-carrier access manner in B1 is adopted. In the examples, it is assumed that a carrier C1 is a primary carrier and carriers C2 to C4 are secondary carriers. For the primary carrier C1, Cat 4 LBT is performed, and for the primary carriers C2 to C4, Cat 2 LBT is performed.

Figure 23A:
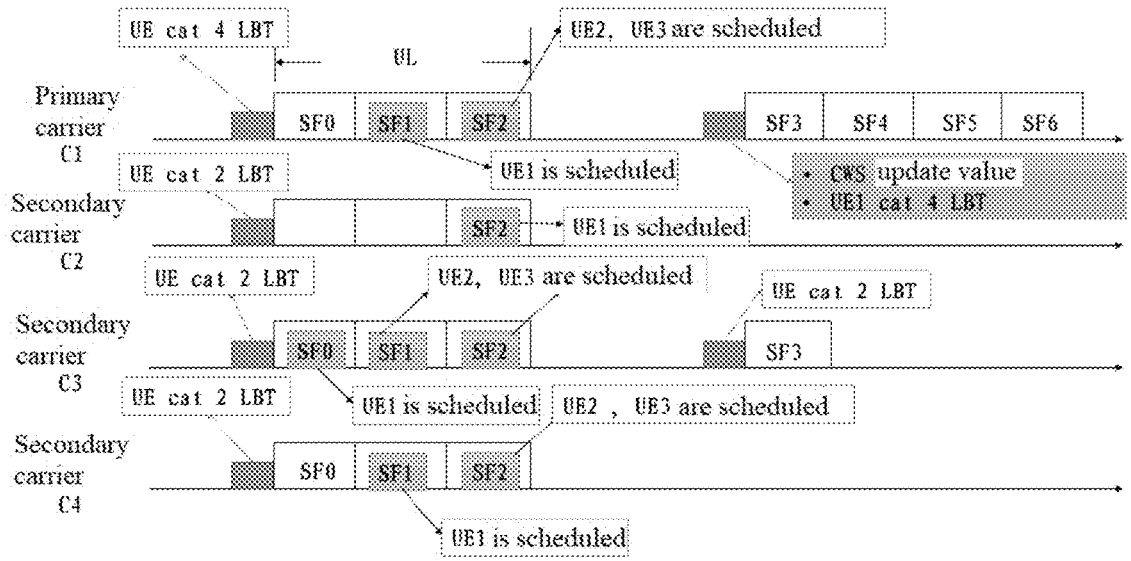
FIG. 23A, FIG. 23B, FIG. 23C and FIG. 23D are schematic diagrams showing exemplary manners of adjusting a contention window size in a case of multi-carrier access.

Firstly, reference is made to FIG. 23A to describe an exemplary manner of adjusting a CWS of a first user equipment on the primary carrier based on the last one of subframes in which the first user equipment is scheduled in each carrier in a previous uplink transmission burst, in a case that the B1 manner is adopted.

In the example, UE1 functions as the first user equipment. In a first burst (corresponding to subframes SF0 to SF2 in the figure), the last subframes in which the UE1 is scheduled on respective carriers are respectively:
subframe SF1 on C1;
subframe SF2 on C2;
subframe SF0 on C3; and
subframe SF1 on C4.

Therefore, the CWS of the UE1 on the primary carrier is adjusted based on subframe SF1 on C1, subframe SF2 on C2, subframe SF0 on C3 and subframe SF1 on C4.

Figure 23B:
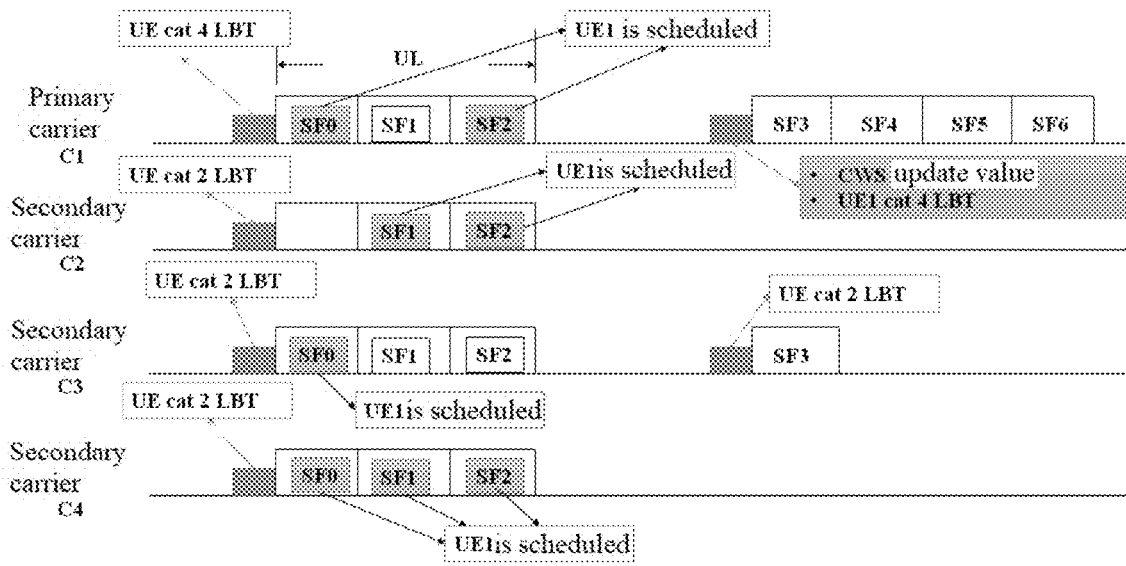

Next, reference is made to FIG. 23B to describe an exemplary manner of adjusting a CWS of a first user equipment on a primary carrier based on all subframes in which the first user equipment is scheduled in each carrier in a previous uplink transmission burst, in a case that the B1 manner is adopted.

In the example, UE1 functions as the first user equipment. In a first burst (corresponding to subframes SF0 to SF2 in the figure), subframes in which the UE1 is scheduled on respective carriers are respectively:
subframes SF0 and SF2 on C1;
subframes SF1 and SF2 on C2;
subframe SF0 on C3; and
subframes SF0, SF1 and SF2 on C4.

Therefore, the CWS of the UE1 on the primary carrier is adjusted based on subframes SF0 and SF2 on C1, subframes SF1 and SF2 on C2, subframe SF0 on C3 and subframes SF0, SF1 and SF2 on C4.

Figure 23C:
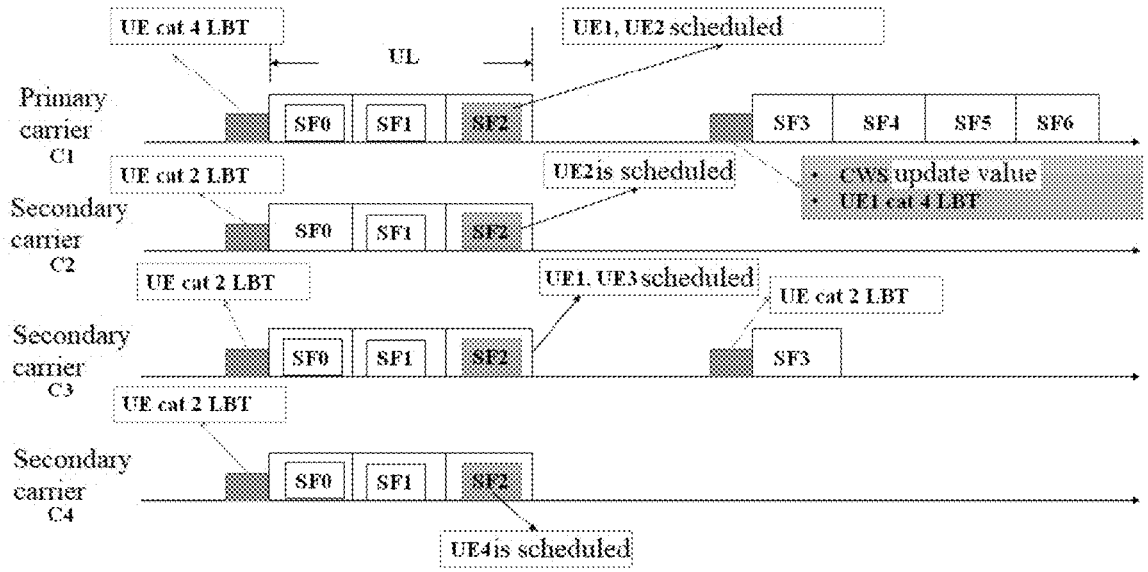

Next, reference is made to FIG. 23C to describe an exemplary manner of adjusting CWSs of all user equipments on a primary carrier based on the last subframe of all user equipments in each carrier in a previous uplink transmission burst, in a case that the B1 manner is adopted.

Specifically, firstly, the CWS adjustment is determined based on PUSCH transmission in the last subframe (SF2) of the following user equipments in each carrier in a previous burst:
transmission of UE1 and UE2 in subframe SF2 on C1;
transmission of UE2 in SF2 on C2;
transmission of UE1 and UE3 in SF2 on C3; and
transmission of UE4 in SF2 on C4.

Subsequently, Cat 4 LBT is performed based on the adjusted CWS by a user equipment which is to perform uplink transmission on the primary carrier in a subsequent burst.

Figure 23D:
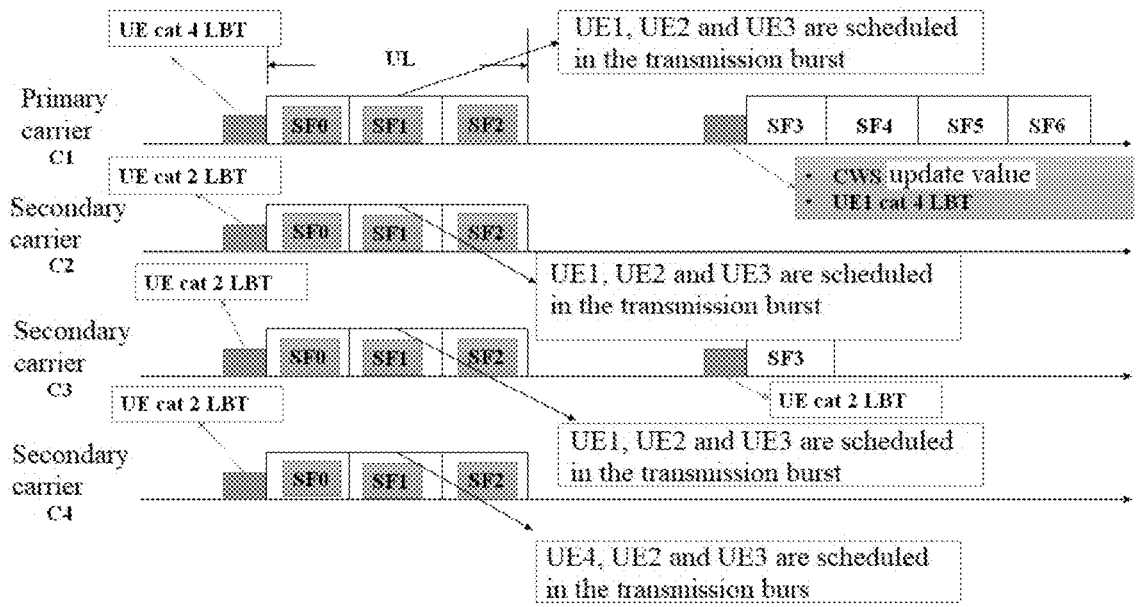

Subsequently, reference is made to FIG. 23D to describe an exemplary manner of adjusting CWSs of all user equipments on a primary carrier based on all subframes of all user equipments in each carrier in a previous uplink transmission burst, in a case that the B1 manner is adopted. In the example, it is assumed that for carriers C1 to C4, UE1 is scheduled on SF0, UE2 is scheduled on SF1, and UE3 is scheduled on SF2.

Specifically, firstly, the CWS adjustment is determined based on PUSCH transmission on all subframes (SF0 to SF2) of the following user equipments in each carrier in the previous burst:
transmission of UE1 in SF0 on C1, transmission of UE2 in SF1 on C1 and transmission of UE3 in SF2 on C1;
transmission of UE1 in SF0 on C2, transmission of UE2 in SF1 on C2 and transmission of UE3 in SF2 on C2;
transmission of UE1 in SF0 on C3, transmission of UE2 in SF1 on C3 and transmission of UE3 in SF2 on C3; and
transmission of UE1 in SF0 on C4, transmission of UE2 in SF1 on C4 and transmission of UE3 in SF2 on C4.

Subsequently, Cat 4 LBT is performed based on the adjusted CWS by a user equipment which is to perform uplink transmission on the primary carrier in a subsequent burst.

Figure 9:
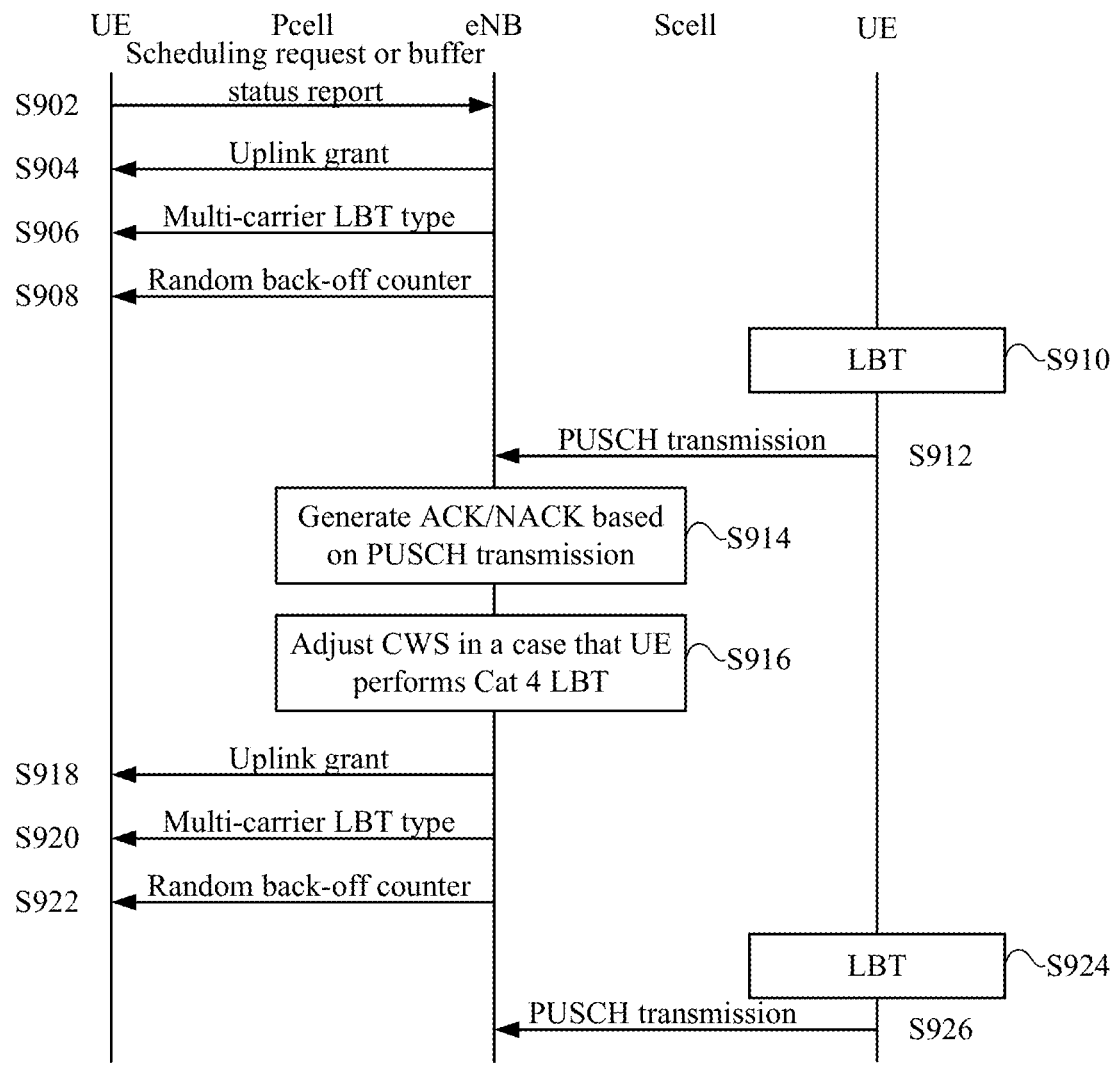
FIG. 9 is a flowchart illustrating signaling applied in a cross-carrier scheduling scene according to an embodiment of the present disclosure.
Figure 10:
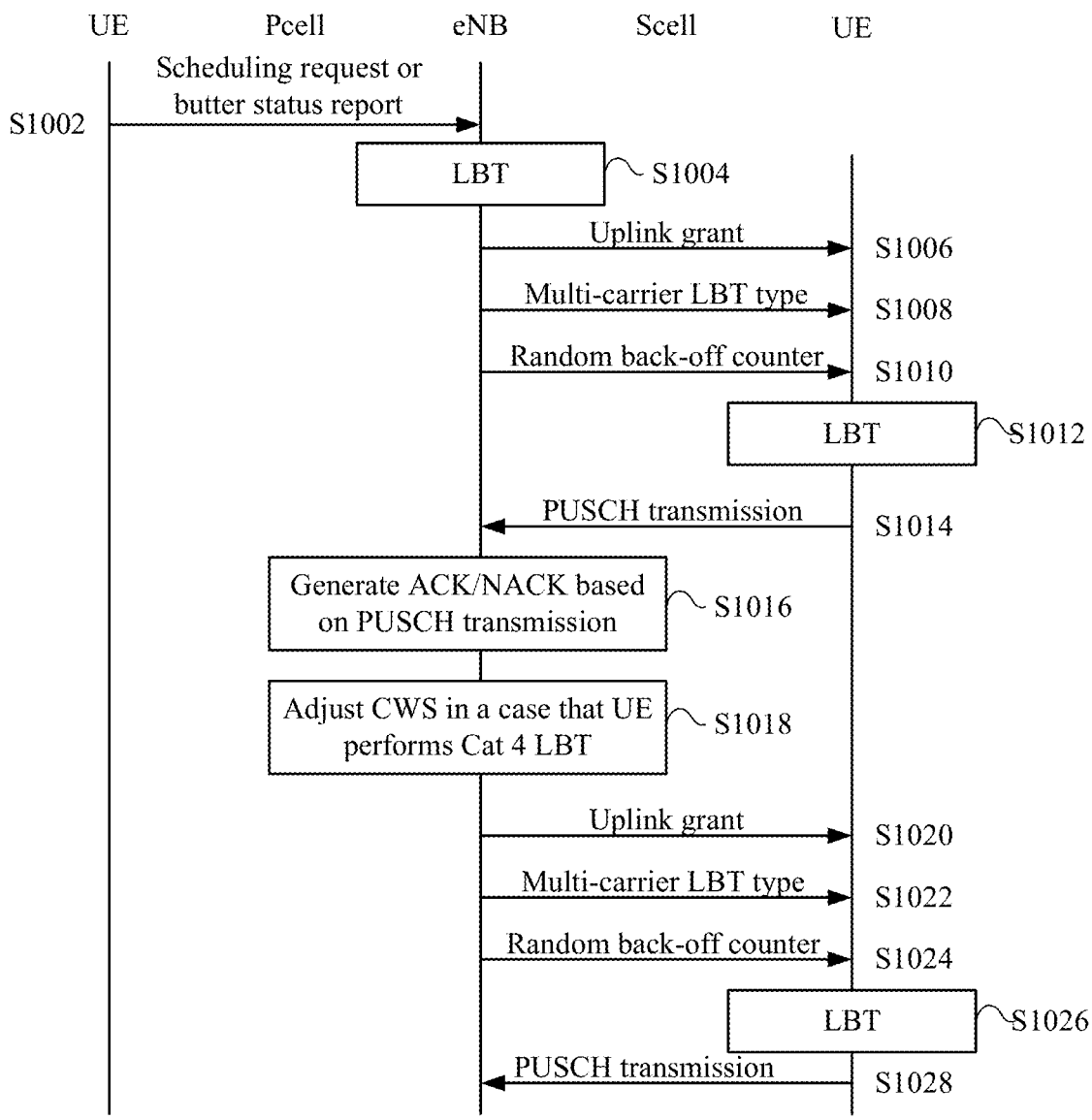
FIG. 10 is a flowchart illustrating signaling applied in a self-carrier scheduling scene according to an embodiment of the present disclosure.

Next, reference is made to FIG. 9 and FIG. 10 to describe process examples of applications in a cross-carrier scheduling scene and a self-carrier scheduling scene according to embodiments of the present disclosure.

As shown in FIG. 9, in step S902, a user equipment UE transmits a scheduling request or a buffer status report to a base station eNB on a primary carrier Pcell.

In step S904, the eNB transmits an uplink grant to the UE via the Pcell.

In step S906, the eNB transmits an LBT type to the UE via the Pcell.

In step S908, the eNB transmits a counter to the UE via the Pcell.

In step 910, the UE performs LBT on a secondary carrier Scell.

In step 912, the UE performs uplink transmission on the secondary carrier Scell.

In step 914, the eNB acquire information on a success rate of uplink transmission.

In step 916, the CWS is adjusted.

In step 918, the eNB transmits an uplink grant to the UE via the Pcell.

In step 920, the eNB transmits an LBT type to the UE via the Pcell.

In step 922, the eNB transmits a counter to the UE via the Pcell.

In step 924, the UE performs LBT on the secondary carrier Scell by using the adjusted CWS.

In step S926, the UE performs uplink transmission on the secondary carrier Scell.

As shown in FIG. 10, in step S1002, a user equipment UE transmits a scheduling request or a buffer status report to a base station eNB on a primary carrier Pcell.

In step S1004, the eNB performs LBT.

In step S1006, the eNB transmits an uplink grant (UL grant) to the UE via the Scell.

In step S1008, the eNB transmits an LBT type to the UE via the Scell.

In step S1010, the eNB transmits a counter to the UE via the Scell.

In step S1012, the UE performs LBT on the secondary carrier Scell.

In step S1014, the UE performs uplink transmission on the secondary carrier Scell.

In step S1016, the eNB acquires information on a success rate of uplink transmission.

In step S1018, the CWS is adjusted.

In step S1020, the eNB transmits an uplink grant to the UE via the Scell.

In step S1022, the eNB transmits an LBT type to the UE via the Scell.

In step S1024, the eNB transmits a counter to the UE via the Scell.

In step S1026, the UE performs LBT on the secondary carrier Scell by using LBT parameters including the adjusted CWS (updated LBT parameters).

In step S1028, the UE performs uplink transmission on the secondary carrier Scell.

Embodiment of the present disclosure also include an information processing apparatus for base station side, which may operate as a base station, for example.

Figure 11:
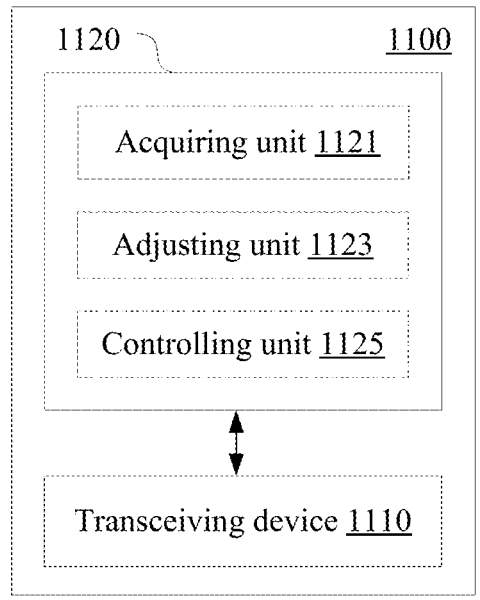
FIG. 11 is a block diagram showing a configuration example of an information processing apparatus for base station side according to an embodiment of the present disclosure.

As shown in FIG. 11, an information processing apparatus 1100 for base station side according to the embodiment includes a transceiving device 1110 and a processing circuit 1120.

The processing circuit 1120 includes an acquiring unit 1121, an adjusting unit 1123 and a controlling unit 1125.

The acquiring unit 1121 is configured to acquire information on a success rate of uplink transmission of at least one user equipment on an unlicensed frequency band. The user equipment performs Listen-Before-Talk for the unlicensed frequency band via a channel detection process which includes a random back-off process having a variable contention window size.

The adjusting unit 1123 is configured to adjust a contention window size of the user equipment based on the information acquired by the acquiring unit 1121.

The controlling unit 1125 is configured to control the transceiving device 1110 to notify the user equipment of the adjusted contention window size or a random back-off counter value generated based on the adjusted contention window size.

It should be understood that, functions of the acquiring unit 1121, the adjusting unit 1123 and the controlling unit 1125 may be implemented by the processing circuit 1120 as a whole, and are not necessarily implemented by discrete actual components in the processing circuit 1120. In addition, although the processing circuit 1120 is shown by one block, the information processing apparatus 1100 may include multiple processing circuits. In addition, the functions of the acquiring unit 1121, the adjusting unit 1123 and the controlling unit 1125 may be distributed onto the multiple processing circuits, and thus the multiple processing circuits cooperate to perform the functions. In addition, the processing circuit 1120 is indicated to be connected to the transceiving device 1110 for conciseness here, and the acquiring unit 1121 and the controlling unit 1125 each may control the transceiving device 1110 to perform corresponding operations.

In the above description of the device and the apparatus according to the embodiment of the present disclosure, some processes and methods are disclosed apparently. Subsequently, an information processing method for base station side according to an embodiment of the present disclosure is described without repeating the details described above.

Figure 12:
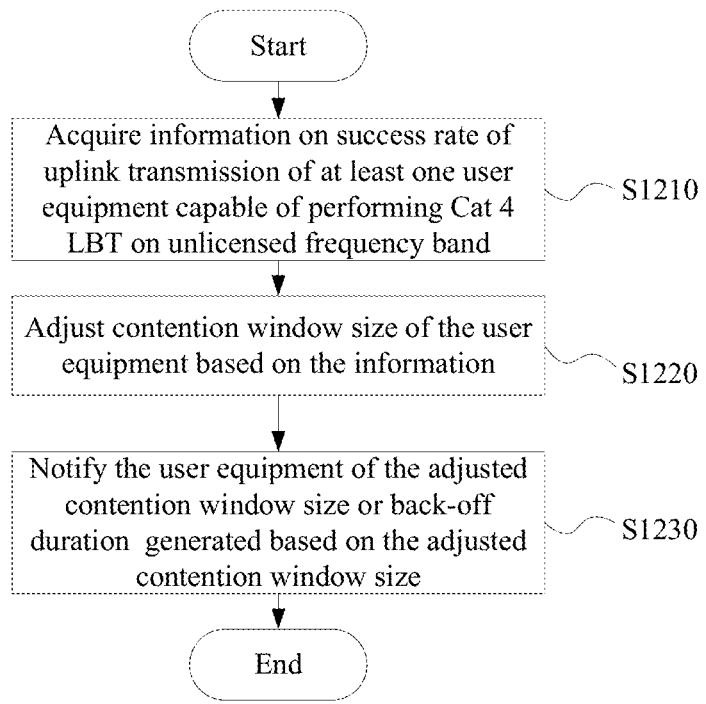
FIG. 12 is a flowchart showing a process example of an information processing method for base station side according to an embodiment of the present disclosure.

As shown in FIG. 12, the information processing method for base station side according to the embodiment of the present disclosure includes the following steps.

In step S1210, information on a success rate of uplink transmission of at least one user equipment on an unlicensed frequency band is acquired. The user equipment performs Listen-Before-Talk on the unlicensed frequency band via a channel detection process which includes a random back-off process having a variable contention window size.

In step S1220, the contention window size of the user equipment is adjusted based on the acquired information.

In step S1230, the user equipment is notified of the adjusted contention window size or a random back-off counter value generated based on the adjusted contention window size.

In addition, embodiments of the present disclosure further include an electronic device, an information processing apparatus and an information processing method for user equipment side. Subsequently, embodiments for user equipment side are described without repeating specific details described above.

Figure 13:
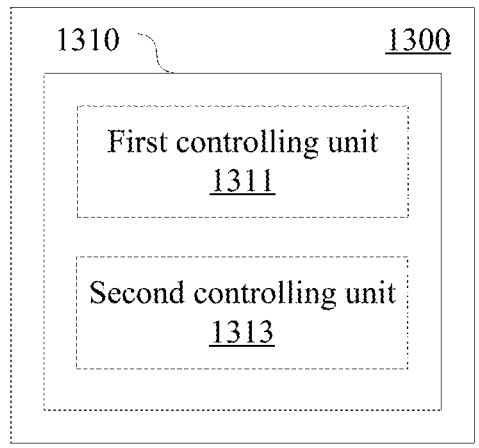
FIG. 13 is a block diagram showing a configuration example of an electronic device for base station side according to an embodiment of the present disclosure.

As shown in FIG. 13, an electronic device 1300 for user equipment side according to the present disclosure includes a processing circuit 1310. The processing circuit includes a first controlling unit 1311 and a second controlling unit 1313.

The first controlling unit 1311 is configured to control to receive information indicating a contention window size or a random back-off counter value generated based on the contention window size. The contention window size is adjusted based on a success rate of uplink transmission of at least one user equipment on an unlicensed frequency band.

The second controlling unit 1313 is configured to control Listen-Before-Talk performed on the unlicensed frequency band via a random back-off process having a variable contention window size, based on the received contention window size or random back-off counter value.

Figure 14:
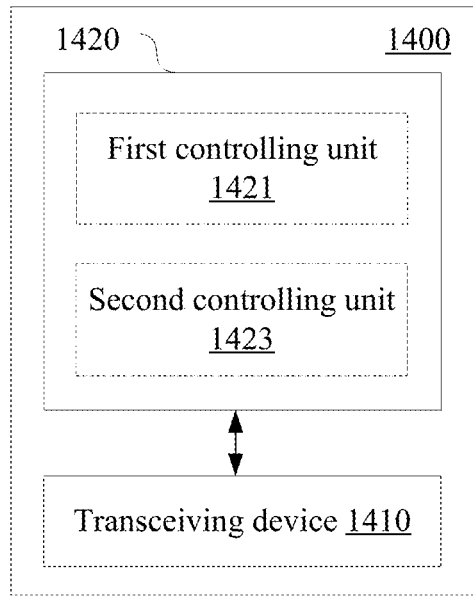
FIG. 14 is a block diagram showing a configuration example of an information processing device for user equipment side according to an embodiment of the present disclosure.

As shown in FIG. 14, an information processing apparatus 1400 for user equipment side according to an embodiment of the present disclosure includes a transceiving device 1410 and a processing circuit 1420. The processing circuit 1420 includes a first controlling unit 1421 and a second controlling unit 1423.

The first controlling unit 1421 is configured to control the transceiving device 1410 to receive information indicating a contention window size or a random back-off counter value generated based on the contention window size. The contention window size is adjusted based on a success rate of uplink transmission of at least one user equipment on an unlicensed frequency band.

The second controlling unit 1423 is configured to control the transceiving device 1410 to perform Listen-Before-Talk on the unlicensed frequency band via a random back-off process having a variable contention window size, based on the received contention window size or random back-off counter value.

Figure 15:
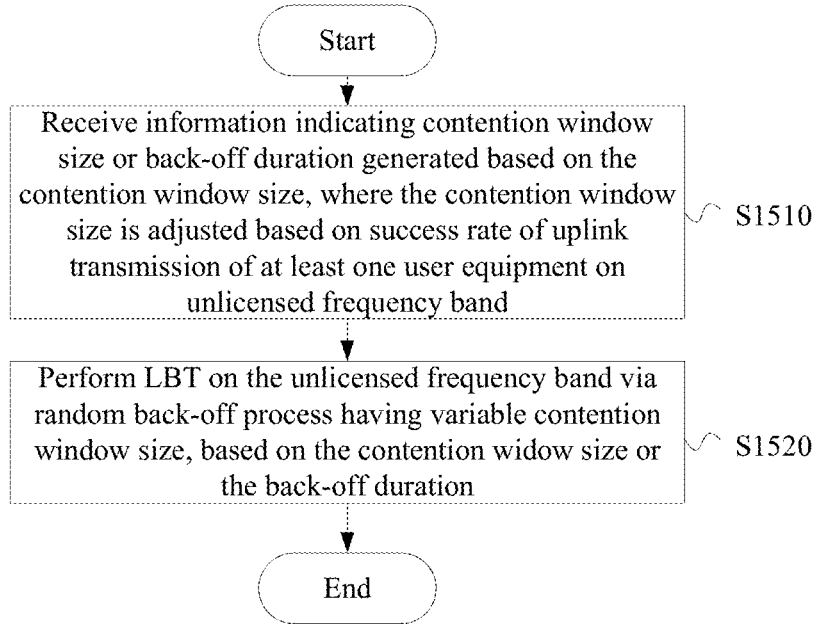
FIG. 15 is a flowchart showing a process example of an information processing method for user equipment side according to an embodiment of the present disclosure.

As shown in FIG. 15, an information processing method for user equipment side according to an embodiment of the present disclosure includes the following steps.

In step S1510, information indicating a contention window size or a random back-off counter value generated based on the contention window size is received. The contention window size is adjusted based on a success rate of uplink transmission of at least one user equipment on an unlicensed frequency band.

In step S1520, Listen-Before-Talk is performed on the unlicensed frequency band via a random back-off process having a variable contention window size, based on the received contention window size or random back-off counter value.

Figure 16:
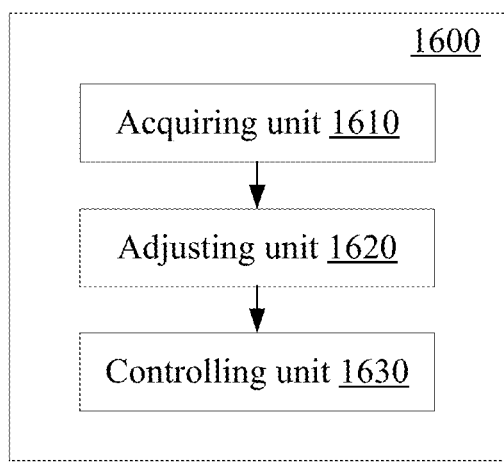
FIG. 16 is a block diagram showing a configuration example of an electronic device for base station side according to an embodiment of the present disclosure.

In addition, as shown in FIG. 16, an electronic device 1600 for base station side according to an embodiment includes an acquiring unit 1610, an adjusting unit 1620 and a controlling unit 1630. The acquiring unit 1610 is configured to acquire information on a success rate of uplink transmission of at least one user equipment on an unlicensed frequency band. The user equipment performs Listen-Before-Talk on the unlicensed frequency band via a channel detection process which includes a random back-off process having a variable contention window size. The adjusting unit 1620 is configured to adjust the contention window size of the user equipment based on the information. The adjusting unit 1630 is configured to notify the user equipment of the adjusted contention window size or a random back-off counter value generated based on the adjusted contention window size.

Figure 17:
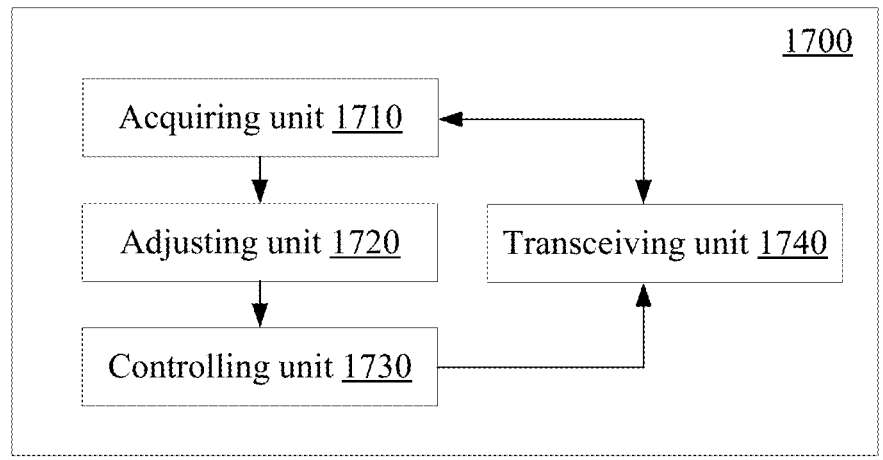
FIG. 17 is a block diagram showing a configuration example of an information processing device for base station side according to an embodiment of the present disclosure.

In addition, as shown in FIG. 17, an information processing apparatus 1700 for base station side according to an embodiment includes an acquiring unit 1710, an adjusting unit 1720, a controlling unit 1730 and a transceiving unit

1740. The acquiring unit 1710 is configured to acquire information on a success rate of uplink transmission of at least one user equipment on an unlicensed frequency band. The user equipment performs Listen-Before-Talk for the unlicensed frequency band via a channel detection process which includes a random back-off process having a variable contention window size. The adjusting unit 1720 is configured to adjust the contention window size of the user equipment based on the information. The controlling unit 1730 is configured to control the transceiving unit 1740 to notify the user equipment of the adjusted contention window size or a random back-off counter value generated based on the adjusted contention window size.

Figure 18:
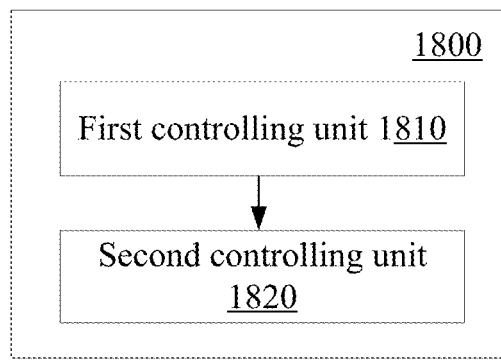
FIG. 18 is a block diagram showing a configuration example of an electronic device for user equipment side according to an embodiment of the present disclosure.

In addition, as shown in FIG. 18, an electronic device 1800 for user equipment side according to an embodiment includes a first controlling unit 1810 and a second controlling unit 1820. The first controlling unit 1810 is configured to control to receive information indicating a contention window size or a random back-off counter value generated based on the contention window size. The contention window size is adjusted based on a success rate of uplink transmission of at least one user equipment on an unlicensed frequency band. The second controlling unit 1820 is configured to control Listen-Before-Talk performed on the unlicensed frequency band via a random back-off process having a variable contention window size, based on the contention window size or the random back-off counter value.

Figure 19:
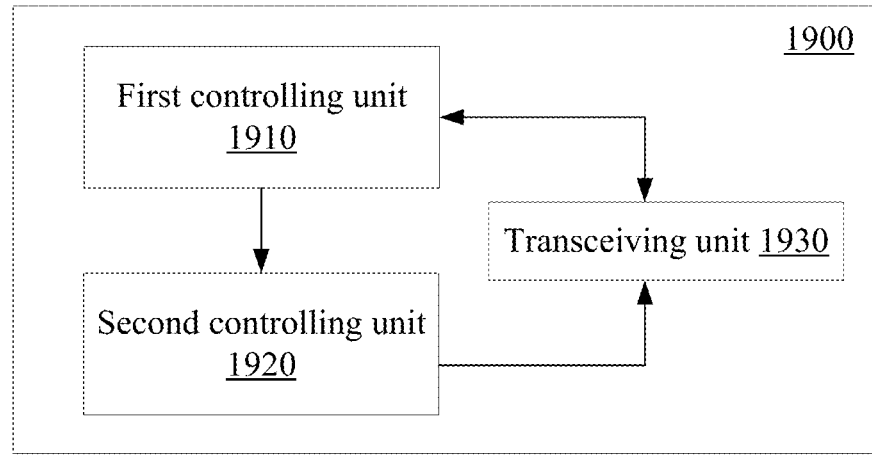
FIG. 19 is a block diagram showing a configuration example of an information processing apparatus for user equipment side according to an embodiment of the present disclosure.

In addition, as shown in FIG. 19, an information processing apparatus 1900 for user equipment side according to an embodiment includes a first controlling unit 1910, a second controlling unit 1920 and a transceiving unit 1930. The first controlling unit 1910 is configured to control the transceiving unit 1930 to receive information indicating a contention window size or a random back-off counter value generated based on the contention window size. The contention window size is adjusted based on a success rate of uplink transmission of at least one user equipment on an unlicensed frequency band. The second controlling unit 1920 is configured to control the transceiving unit 1930 to perform Listen-Before-Talk on the unlicensed frequency band via a random back-off process having a variable contention window size, based on the contention window size or the random back-off counter value.

As an example, various steps of the methods above and various modules and/or units of the devices above may be implemented as software, firmware, hardware or a combination thereof. In a case of implementing by software or firmware, programs consisting of the software for implementing the methods above are installed to a computer with a dedicated hardware structure (for example a general-purpose computer 2000 shown in FIG. 20) from the storage medium or the network. The computer can perform various types of functions when installed with various types of programs.

Figure 20:
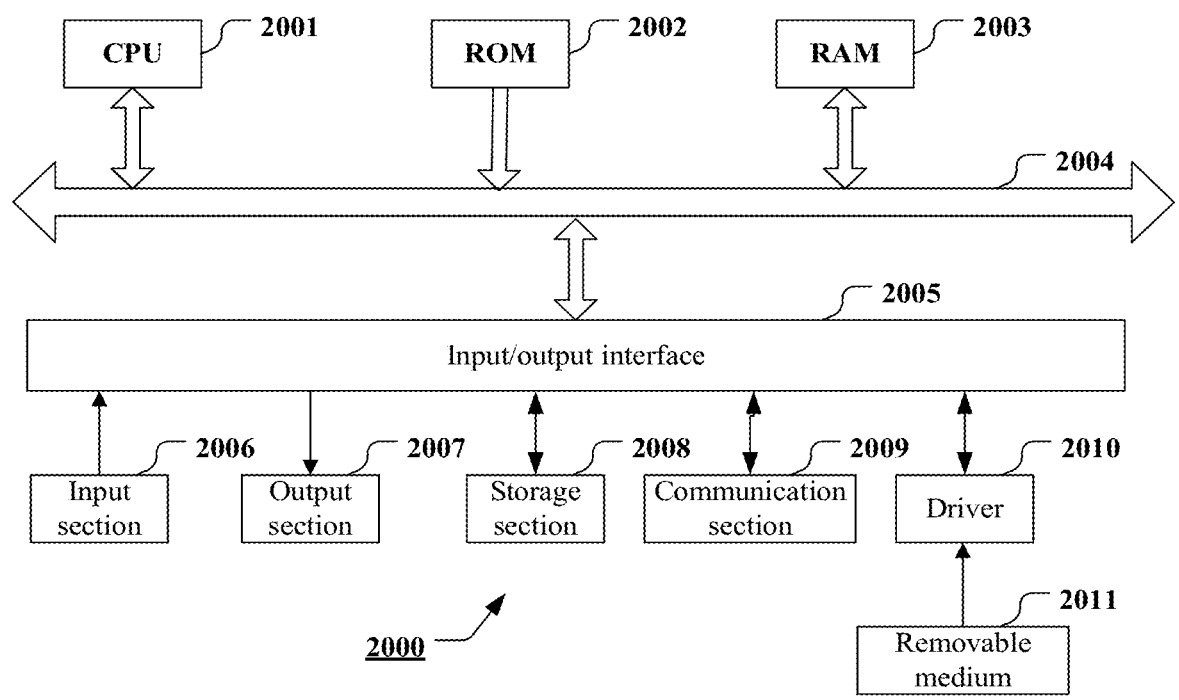
FIG. 20 is a block diagram showing an exemplary structure of a computer for implementing the method and apparatus according to the present disclosure.

In FIG. 20, a central processing unit (CPU) 2001 performs various types of processing according to programs stored in a read only memory (ROM) 2002 or programs loaded from a storage section 2008 to a random access memory (RAM) 2003. Data required when the CPU 2001 performs various types of processing is also stored in the RAM 2003 as needed. The CPU 2001, the ROM 2002 and the RAM 2003 are linked to each other via a bus 2004. An input/output interface 2005 is also linked to the bus 2004.

The following components are linked to the input/output interface 2005: an input section 2006 (including a keyboard, and a mouse and so on), an output section 2007 (including a display, for example a cathode ray tube (CRT) and a liquid crystal display (LCD), and a loudspeaker), a storage section 2008 (including a hard disk and so on), and a communication section 2009 (including a network interface card for example a LAN card, and a modem). The communication section 2009 performs communication processing via a network for example the Internet. A driver 2010 may also be linked to the input/output interface 2005 as needed. A removable medium 2011 for example a magnetic disk, an optical disk, a magnetic-optical disk and a semiconductor memory may be installed on the driver 2010 as needed, such that computer programs read from the removable medium 2011 are installed on the storage section 2008 as needed.

In a case of performing the series of processing described above by software, programs consisting of the software are installed from the network for example the Internet or the storage medium for example the removable medium 2011.

Those skilled in the art should understand that the storage medium is not limited to the removable medium 2011 shown in FIG. 20 which stores programs and is distributed separately from the device to provide the programs to the user. Examples of the removable medium 2011 include: a magnetic disk (including a floppy disk (registered trademark), an optical disk (including a compact disk read only memory (CD-ROM) and a digital versatile disk (DVD), a magnetic-optical disk (including a mini disk (MD) (registered trademark)), and a semiconductor memory. Alternatively, the storage medium may be a hard disk included in the ROM 2002 and the storage section 2008 which stores programs. The storage medium and the device including thereof together are distributed to the user.

A program product storing machine readable instruction codes is further provided according to the embodiments of the present disclosure. When read and executed by a machine, the instruction codes cause the machine to perform the method according to the embodiment of the present disclosure.

Accordingly, a storage medium for carrying the program product storing the machine readable instruction codes is further provided according to the present disclosure. The storage medium includes but not limited to a floppy disk, an optical disk, a magnetic-optical disk, a storage card and a memory stick and so on.

The embodiments of the present disclosure further relate to an electronic device in the following. In a case that the electronic device is for base station side, the electronic device may be implemented as any type of evolved node B (eNB), such as a macro eNB and a small eNB. The small eNB may be an eNB covering a cell smaller than a macro cell, such as a pico eNB, a micro eNB and a home (femto) eNB. Alternatively, the electronic device may be implemented as any other type of base stations, such as a NodeB and a base transceiver station (BTS). The electronic device may include: a body configured to control wireless communication (also referred to as a base station device); and one or more remote radio heads (RRH) located at positions different from the body. In addition, various types of terminals described in the following each may function as a base station to operate by performing functions of the base station temporarily or in a semi-permanent manner.

In a case that the electronic device is for user equipment side, the electronic device may be implemented as mobile terminals (such as a smart phone, a tablet personal computer (PC), a notebook PC, a portable game terminal, a portable/dongle mobile router and a digital camera) or a vehicle terminal (such as an automobile navigation device). In addition, the electronic device may be a wireless communication module installed on each of the above terminals (such as an integrated circuit module including one or more chips).

[Application Example on Terminal Device]

Figure 21:
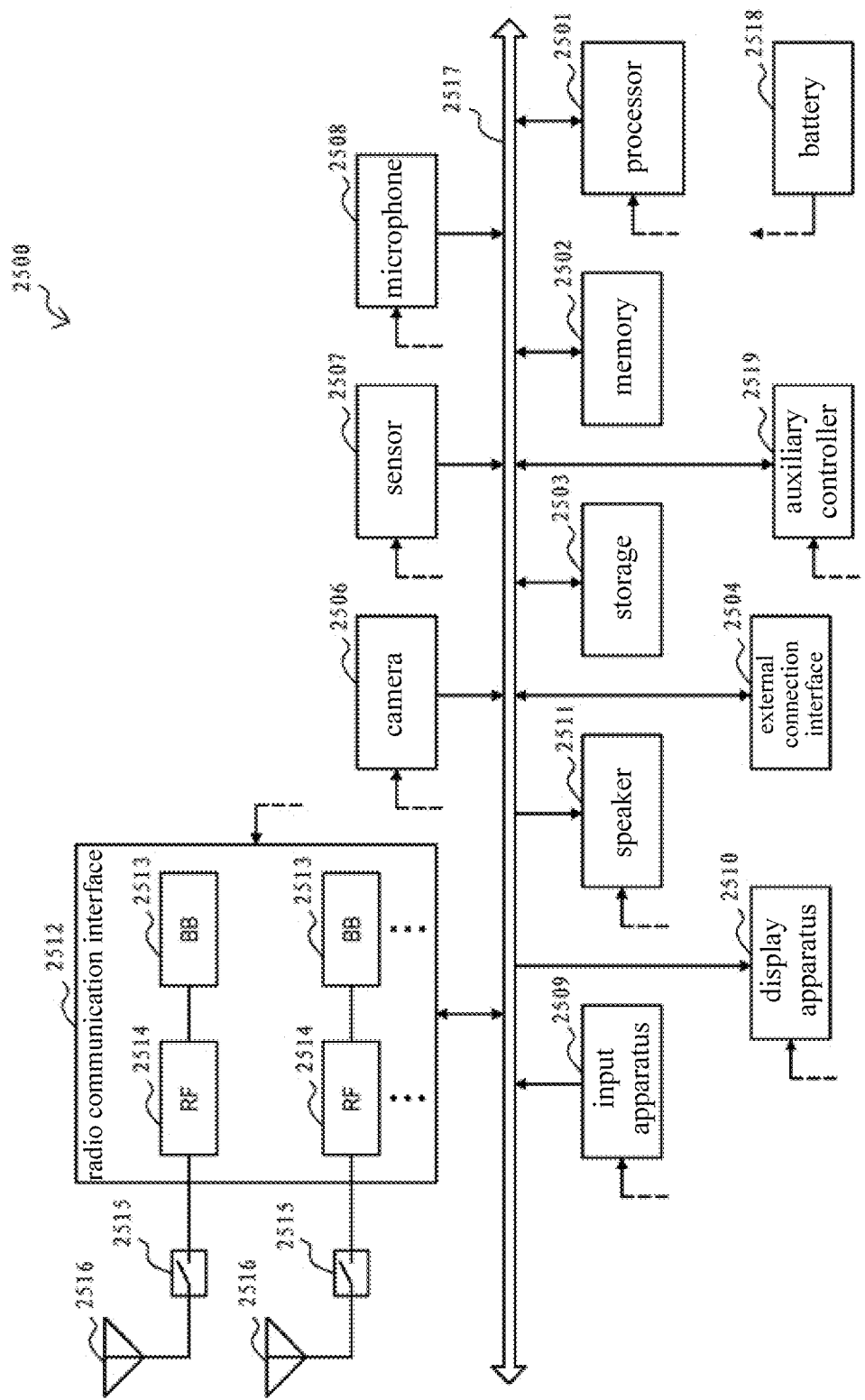
FIG. 21 is a block diagram showing an example of a schematic configuration of a smart phone to which the content of the present disclosure may be applied.

FIG. 21 is a block diagram illustrating an example of a schematic configuration of a smart phone 2500 to which the technology of the present disclosure may be applied. The smart phone 2500 includes a processor 2501, a memory 2502, a storage 2503, an external connection interface 2504, a camera 2506, a sensor 2507, a microphone 2508, an input apparatus 2509, a display apparatus 2510, a speaker 2511, a radio communication interface 2512, one or more antenna switches 2515, one or more antennas 2516, a bus 2517, a battery 2518, and an auxiliary controller 2519.

The processor 2501 may be, for example, a CPU or a system on a chip (SoC), and controls functions of an application layer and another layer of the smart phone 2500. The memory 2502 includes RAM and ROM, and stores a program that is executed by the processor 2501, and data. The storage 2503 may include a storage medium such as a semiconductor memory and a hard disk. The external connection interface 2504 is an interface for connecting an external apparatus such as a memory card and a universal serial bus (USB) apparatus to the smart phone 2500.

The camera 2506 includes an image sensor such as a charge coupled device (CCD) and a complementary metal oxide semiconductor (CMOS), and generates a captured image. The sensor 2507 may include a group of sensors such as a measurement sensor, a gyro sensor, a geomagnetic sensor, and an acceleration sensor. The microphone 2508 converts sounds that are input to the smart phone 2500 into audio signals. The input apparatus 2509 includes, for example, a touch sensor configured to detect touch onto a screen of the display apparatus 2510, a keypad, a keyboard, a button, or a switch, and receive an operation or information input from a user. The display apparatus 2510 includes a screen such as a liquid crystal display (LCD) and an organic light-emitting diode (OLED) display, and displays an output image of the smart phone 2500. The speaker 2511 converts audio signals that are output from the smart phone 2500 into sounds.

The radio communication interface 2512 supports any cellular communication scheme such as LTE and LTE-Advanced, and performs radio communication. The radio communication interface 2512 may typically include, for example, a BB processor 2513 and an RF circuit 2514. The BB processor 2513 may perform, for example, encoding/decoding, modulating/demodulating, and multiplexing/demultiplexing, and performs various types of signal processing for radio communication. Meanwhile, the RF circuit 2514 may include, for example, a mixer, a filter, and an amplifier, and transmits and receives radio signals via the antenna 2516. The radio communication interface 2512 may be a chip module having the BB processor 2513 and the RF circuit 2514 integrated thereon. The radio communication interface 2512 may include multiple BB processors 2513 and multiple RF circuits 2514, as illustrated in FIG. 21. Although FIG. 21 illustrates the example in which the radio communication interface 2512 includes the multiple BB processors 2513 and the multiple RF circuits 2514, the radio communication interface 2512 may also include a single BB processor 2513 or a single RF circuit 2514.

Furthermore, in addition to a cellular communication scheme, the radio communication interface 2512 may support another type of radio communication scheme such as a short-distance radio communication scheme, a near field communication scheme, and a radio local area network (LAN) scheme. In this case, the radio communication interface 2512 may include the BB processor 2513 and the RF circuit 2514 for each radio communication scheme.

Each of the antenna switches 2515 switches connection destinations of the antennas 2516 among multiple circuits (such as circuits for different radio communication schemes) included in the radio communication interface 2512.

Each of the antennas 2516 includes a single or multiple antenna elements (such as multiple antenna elements included in an MIMO antenna), and is used for the radio communication interface 2512 to transmit and receive radio signals. The smart phone 2500 may include the multiple antennas 2516, as illustrated in FIG. 21. Although FIG. 21 illustrates the example in which the smart phone 2500 includes the multiple antennas 2516, the smart phone 2500 may also include a single antenna 2516.

Furthermore, the smart phone 2500 may include the antenna 2516 for each radio communication scheme. In this case, the antenna switches 2515 may be omitted from the configuration of the smart phone 2500.

The bus 2517 connects the processor 2501, the memory 2502, the storage 2503, the external connection interface 2504, the camera 2506, the sensor 2507, the microphone 2508, the input apparatus 2509, the display apparatus 2510, the speaker 2511, the radio communication interface 2512, and the auxiliary controller 2519 to each other. The battery 2518 supplies power to blocks of the smart phone 2500 illustrated in FIG. 10 via feeder lines, which are partially shown as dashed lines in the figure. The auxiliary controller 2519 operates a minimum necessary function of the smart phone 2500, for example, in a sleep mode.

In the smart phone 2500 shown in FIG. 21, the transceiving device or the transceiving unit of the information processing apparatus for user equipment side according to the embodiment of the present disclosure may be implemented by the radio communication interface 2512. At least a part of functions of processing circuits and/or units of the electronic device or information processing apparatus for user equipment side according to the embodiment of the present disclosure may be implemented by a processor 2501 or an auxiliary controller 2519. For example, power consumption of the battery 2518 may be reduced by performing a part of the functions of the processor 2501 by the auxiliary controller 2519. In addition, the processor 2501 or the auxiliary controller 2519 may perform at least a part of the functions of the processing circuits and/or the units of the electronic device or information processing apparatus for user equipment side according to the embodiment of the present disclosure by executing programs stored in the memory 2502 or the storage 2503.

[Application Example on a Base Station]

Figure 22:
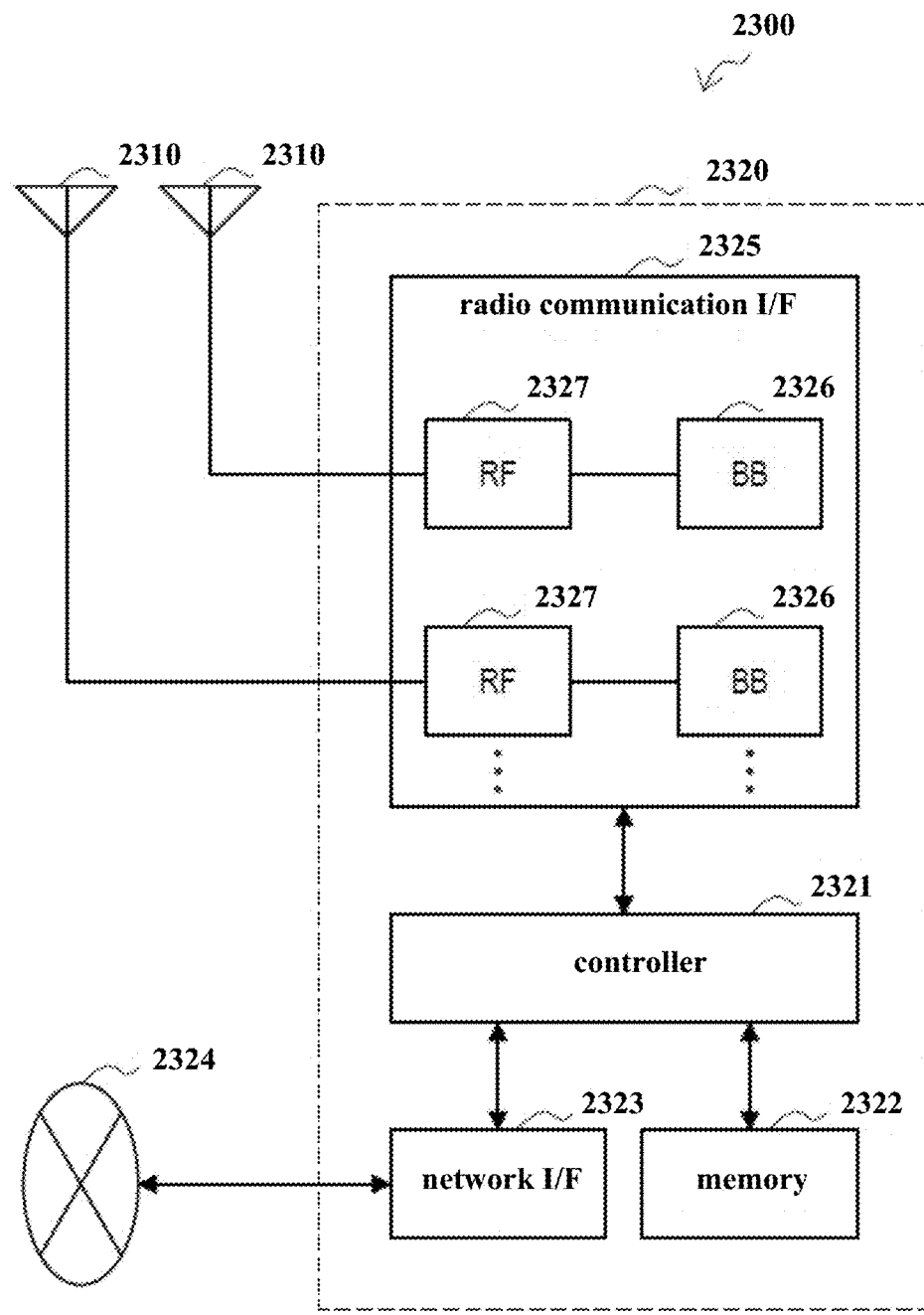
FIG. 22 is a block diagram showing an example of a schematic configuration of an evolution node B (eNB) to which the content of the present disclosure may be applied.

FIG. 22 is a block diagram of an example of a schematic configuration of an eNB to which the technology of the present disclosure may be applied. An eNB 2300 includes one or more antennas 2310 and a base station device 2320. The base station device 2320 and each antenna 2310 may be connected to each other via a radio frequency (RF) cable.

Each of the antennas 2310 includes one or more antenna elements (such as multiple antenna elements included in a multiple input multiple output (MIMO) antenna) and is used by the base station device 2320 to transmit and receive a radio signal. As shown in FIG. 22, the eNB 2300 may include multiple antennas 2310. For example, the multiple antennas 2310 may be compatible with multiple frequency bands used by the eNB 2300. Although FIG. 22 shows an example in which the eNB 2300 includes multiple antennas 2310, the eNB 2300 may include a single antenna 2310.

The base station device 2320 includes a controller 2321, a memory 2322, a network interface 2323 and a radio communication interface 2325.

The controller 2321 may be a CPU or a DSP and control various functions of higher layers of the base station device 2320. For example, the controller 2321 generates a data packet based on data in a signal processed by the radio communication interface 2325, and transfers the generated packet via a network interface 2323. The controller 2321 may bind data from multiple baseband processors to generate a binding packet and transfer the generated binding packet. The controller 2321 may have logic functions for performing the following control: radio resource control, radio carrying control, mobility management, admission control and schedule. The control may be performed in combination with an adjacent eNB or a core network node. The memory 2322 includes RAM and ROM, and stores programs executed by the controller 2321 and various types of control data (such as a terminal list, transmission power data and scheduling data).

The network interface 2323 is configured to connect the base station device 2320 to a communication interface of the core network 2324. The controller 2321 may communication with the core network node or another eNB via the network interface 2323. In this case, the eNB 2300 and the core network node or another eNB may be connected to each other via a logic interface (such as an S1 interface or an X2 interface). The network interface 2323 may be a wired communication interface or a radio communication interface for a wireless backhaul line. If the network interface 2323 is a radio communication interface, the network interface 2323 may use a higher frequency band for wireless communication as compared with the frequency band used by the radio communication interface 2325.

The radio communication interface 2325 supports any cellular communication scheme (such as long term evolution (LTE) and LTE-advanced), and provides a radio connection to a terminal located in a cell of the eNB 2300 via an antenna 2310. The radio communication interface 2325 may generally include a baseband (BB) processor 2326 and an RF circuit 2327. The BB processor 2326 may perform for example encoding/decoding, modulating/demodulating and multiplexing/demultiplexing, and various types of signal processing of layers (such as L1, medium access control (MAC), radio link control (RLC) and packet data convergence protocol (PDCP)). Instead of the controller 2321, the BB processor 2326 may have a part or all of the above logic functions. The BB processor 2326 may be a memory storing communication control programs or a module including a processor configured to execute programs and a related circuit. Updating programs may change functions of the BB processor 2326. The module may be a card or a blade inserted into a slot of the base station device 2320. Alternatively, the module may be a chip installed on the card or the blade. The RF circuit 2327 may include for example a mixer, a filter or an amplifier, and transmits and receives a radio signal via the antenna 2310.

As shown in FIG. 22, the radio communication interface 2325 may include multiple BB processors 2326. For example, the multiple BB processors 2326 may be compatible with multiple frequency bands used by the eNB 2300. As shown in FIG. 22, the radio communication interface 2325 may include multiple RF circuits 2327. For example, the multiple RF circuits 2327 may be compatible with multiple antenna elements. Although FIG. 22 shows an example in which the radio communication interface 2325 includes multiple BB processors 2326 and multiple RF circuits 2327, the radio communication interface 2325 may include a single BB processor 2326 or a single RF circuit 2327.

In the eNB 2300 shown in FIG. 22, the transceiving device or the transceiving unit of the information processing apparatus for base station side according to the embodiment of the present disclosure may be implemented by the radio communication interface 2325. At least a part of the functions of processing circuits and/or units of the electronic device or information processing apparatus for base station side according to the embodiment of the present disclosure may be implemented by the controller 2321. For example, the controller 2321 may perform at least a part of the functions of the processing circuits and/or units of the electronic device or information processing apparatus for base station side according to the embodiment of the present disclosure by performing the programs stored in the memory 2322.

In the description of specific embodiments of the present disclosure above, features described and/or illustrated for one embodiment may be used in one or more other embodiments in the same or similar manner, combined with features in other embodiments, or substitute for features in other embodiments.

It should be noted that, terms "including/comprising" used herein refer to existing of features, elements, steps or components, but existing or adding of one or more other features, elements, steps or components is not excluded.

In the above embodiments and examples, reference numerals consisting of numbers are used to indicate various steps and/or units. Those skilled in the art should understand that the reference numerals are used to facilitate describing and drawing, and are not intended to indicate an order or limit in any way.

In addition, the method according to the present disclosure is not limited to be performed in a time order described in the description, and may be performed according to other time orders, in parallel or independently. Therefore, the order in which the method described in the description is performed does not limit the technical scope of the present disclosure.

Although the present disclosure is disclosed by the description of specific embodiments of the present disclosure above, it should be understood that all the embodiments and examples described above are only schematic and are not intended to limit. For those skilled in the art, various changes, improvements or equivalents may be designed to for the present disclosure within the spirit and scope of the appended claims. The changes, improvements or equivalents should be regarded as falling within the protection scope of the present disclosure.

The invention claimed is:

1. An electronic device, comprising:
   a processing circuit configured to
   acquire information on a status of uplink transmission of at least one user equipment on an unlicensed frequency band, wherein the user equipment performs Listen-Before-Talk on the unlicensed frequency band via a channel detection process which comprises a random back-off process having a variable contention window size, and wherein the status is defined as whether a previous uplink transmission is correctly received;
   adjust the contention window size of the user equipment based on the information; and control to notify the user equipment of the adjusted contention window size or a random back-off counter value generated based on the adjusted contention window size.

2. The electronic device according to claim 1, wherein
the information indicates a status of uplink transmission of a first user equipment among the user equipments in at least one subframe in a previous uplink transmission burst, wherein the first user equipment is scheduled in the at least one subframe; and
the adjusting comprises adjusting a contention window size of the first user equipment.

3. The electronic device according to claim 2, wherein the at least one subframe is the last one of subframes in which the first user equipment is scheduled in the previous uplink transmission burst.

4. The electronic device according to claim 2, wherein the at least one subframe comprises all of subframes in which the first user equipment is scheduled in the previous uplink transmission burst.

5. The electronic device according to claim 1, wherein
the information indicates a status of uplink transmission of all the user equipments in at least one subframe in a previous uplink transmission burst.

6. The electronic device according to claim 5, wherein the at least one subframe is the last subframe in the previous uplink transmission burst.

7. The electronic device according to claim 5, wherein the at least one subframe comprises all subframes in the previous uplink transmission burst.

8. The electronic device according to claim 1, wherein the uplink transmission comprises Physical Uplink Shared Channel transmission.

9. The electronic device according to claim the adjusting comprises:
increasing the contention window size in a case where the status of transmission is lower than a predetermined threshold.

10. The electronic device according to claim 1, wherein the contention window size is selected from a plurality of predetermined contention window sizes, and
the adjusting comprises: switching the selection of the predetermined contention window size.

11. The electronic device according to claim 10, wherein the plurality of predetermined contention window sizes comprise a plurality of groups of contention window sizes predetermined according to channel access priorities.

12. The electronic device according to claim 1, wherein the processing circuit is configured to perform the acquiring and the adjusting for each of a plurality of carriers on an unlicensed frequency band, and
the controlling comprises:
notifying the user equipment of a contention window size adjusted for a corresponding carrier or a random back-off counter value generated based on the adjusted contention window size, to be used for the corresponding carrier.

13. The electronic device according to claim 1, wherein the processing circuit is configured to perform the acquiring and the adjusting for each of a plurality of carriers on an unlicensed frequency hand, and
the controlling comprises:
generating a random back-off counter value based on a maximum contention window size among contention window sizes adjusted for respective carriers; and
notifying the user equipment of the random back-off counter value generated based on the maximum contention window size, to be used for Listen-Before-Talk of all the carriers.

14. The electronic device according to claim 1. wherein the processing circuit is configured to perform the acquiring and the adjusting for a primary carrier of a plurality of carriers on the unlicensed frequency hand in one of the following manners:
acquiring the information according to the last one of subframes in which a first user equipment is scheduled on each of the plurality of carriers in a previous uplink transmission burst, and adjusting a contention window size of the first user equipment for the primary carrier;
acquiring the information according to all subframes in which the first user equipment is scheduled on each of the plurality of carriers in a previous uplink transmission burst, and adjusting a contention window size of the first user equipment for the primary carrier;
acquiring the information according to the last subframe of all the user equipments on each of the plurality of carriers in a previous uplink transmission burst, and adjusting contention window sizes of all the user equipments for the primary carrier; and
acquiring the information according to all subframes of all the user equipments on each of the plurality of carriers in a previous uplink transmission burst, and adjusting contention window sizes of all the user equipments for the primary carrier.

15. The electronic device according to claim 1, wherein the processing circuit is configured to perform the acquiring and the adjusting for each of a plurality of carriers on the unlicensed frequency band, and
the controlling comprises:
generating a random back-off counter Value based on the maximum contention window size among contention window sizes adjusted for respective carriers; and
notifying the user equipment of the random back-off counter value generated based on the maximum contention window size, to be used for a channel detection process of a primary carrier.

16. An electronic device, comprising:
a processing circuit configured to:
control to acquire information indicating a contention window size or a random back-off counter value generated based on the contention window size, wherein the contention window size is adjusted based on a status of uplink transmission of at least one user equipment on an unlicensed frequency band; and
control, based on the contention window size or the random back-off counter value, Listen-Before-Talk performed on the unlicensed frequency band via a random back-off process having a variable contention window size.

17. An information processing method, comprising:
receiving information indicating a contention window size or a random hack-off counter value generated based on the contention window size;
acquiring information indicating a status of a previous uplink transmission of at least one user equipment on an unlicensed frequency band, wherein the status is defined as whether a previous uplink transmission is correctly received;
adjusting, based on the information indicating the status of the previous uplink transmission of the at least one user equipment, the contention window size; and performing, based on the adjusted contention window size or the random back-off counter value, Listen-Before-Talk on the unlicensed frequency band via a random back-off process having a variable contention window size.

18. An electronic device in a wireless communication system, comprising:
at least one circuitry configured to
receive uplink scheduling grant from base station;
acquiring information indicating a status of a previous uplink transmission of the electronic device on an unlicensed frequency band, wherein the information at least indicates the status of the previous uplink transmission in at least one of last subframe and all suhframes of the previous uplink transmission;
adjust a contention window size or a random hack-off counter value generated based on the contention window size used for Listen-Before-Talk procedure on the unlicensed frequency band; and
perform, based on the adjusted contention window size or the random back-off counter Value, the Listen-Before-Talk procedure on the unlicensed frequency.

19. The electronic device according to claim 18, wherein the status is defined as whether the previous uplink transmission is correctly received.

\* \* \* \* \*